US 9,462,600 B2

(12) United States Patent
Dural et al.

(10) Patent No.: US 9,462,600 B2
(45) Date of Patent: Oct. 4, 2016

(54) TIME BUDGET MANAGEMENT FOR WLAN AND WWAN PROCESSING FOR INTER-FREQUENCY/INTER-RAT MEASUREMENTS FOR LTE

(71) Applicant: QUALCOMM Incorporated, San Diego, CA (US)

(72) Inventors: Ozgur Dural, San Diego, CA (US); Kaushik Chakraborty, San Diego, CA (US); Soumya Das, San Diego, CA (US); Olufunmilola Awoniyi-Oteri, San Diego, CA (US); Won-ick Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 14/480,179

(22) Filed: Sep. 8, 2014

(65) Prior Publication Data
US 2016/0073399 A1 Mar. 10, 2016

(51) Int. Cl.
*H04W 72/12* (2009.01)
*H04W 84/12* (2009.01)
*H04W 88/06* (2009.01)

(52) U.S. Cl.
CPC ......... *H04W 72/1215* (2013.01); *H04W 84/12* (2013.01); *H04W 88/06* (2013.01)

(58) Field of Classification Search
CPC H04W 72/0446; H04W 24/08; H04W 84/12
See application file for complete search history.

(56) References Cited

U.S. PATENT DOCUMENTS

| | | | |
|---|---|---|---|
| 7,899,396 B2 | 3/2011 | Meylan et al. | |
| 7,986,665 B2 | 7/2011 | Kezys et al. | |
| 8,499,021 B2 | 7/2013 | Jarosinski | |
| 8,537,799 B2 | 9/2013 | Tsfati et al. | |
| 8,630,272 B2 | 1/2014 | Park et al. | |
| 2008/0189970 A1* | 8/2008 | Wang | H04W 36/0055 33/701 |
| 2014/0146732 A1 | 5/2014 | Olufunmilola | |

FOREIGN PATENT DOCUMENTS

| | | |
|---|---|---|
| EP | 2495428 A1 | 9/2012 |
| WO | 2013106473 A1 | 7/2013 |

OTHER PUBLICATIONS

International Search Report and Written Opinion—PCT/US2015/044888—ISA/EPO—Nov. 16, 2015.

* cited by examiner

*Primary Examiner* — Mohammad Anwar
(74) *Attorney, Agent, or Firm* — Arent Fox LLP

(57) ABSTRACT

A time period associated with each of a plurality of tasks included in a current instance of WWAN data capture/processing by a WLAN processor and a WWAN processor is determined. A total time period comprising the respective time periods of each task is compared to an overall time budget criterion to obtain a comparison outcome. A change in at least one of the tasks based on the comparison outcome is implemented. The change results in an adjustment of the total time period associated with a next instance of WWAN data capture/processing by the WLAN processor and the WWAN processor.

24 Claims, 21 Drawing Sheets

TIME BUDGET MANAGEMENT FOR WLAN AND WWAN PROCESSING FOR INTER-FREQUENCY/INTER-RAT MEASUREMENTS FOR LTE

BACKGROUND

1. Field

The present disclosure relates generally to communication systems, and more particularly, to time budget management of tasks related to wireless local area network (WLAN) and wireless wide area network (WWAN) processing for inter-frequency and/or inter-radio access technology (RAT) measurements for LTE.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Methods, computer program products, and apparatuses are provided. In a method, a time period associated with each of a plurality of tasks included in a current instance of WWAN data capture/processing by a WLAN processor and a WWAN processor is determined. A total time period comprising the respective time periods of each task is compared to an overall time budget criterion to obtain a comparison outcome. A change in at least one of the tasks based on the comparison outcome is implemented. The change results in an adjustment of the total time period associated with a next instance of WWAN data capture/processing by the WLAN processor and the WWAN processor.

DETAILED DESCRIPTION

Figure 1:
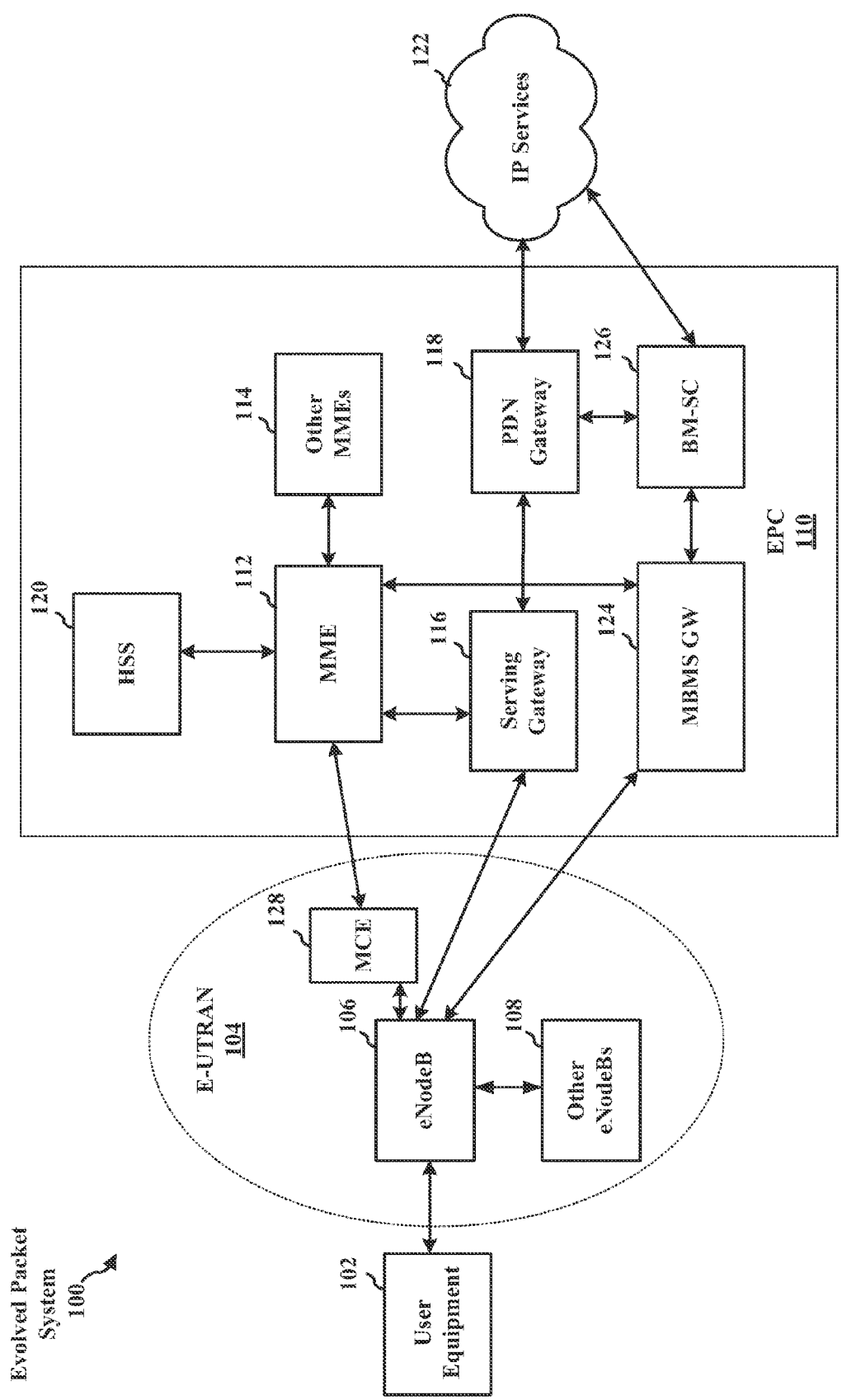
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway (SGW) 116, a Multimedia Broadcast Multicast Service (MBMS) Gateway 124, a Broadcast Multicast Service Center (BM-SC) 126, and a Packet Data Network (PDN) Gateway (PGW) 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a Public Land Mobile Network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
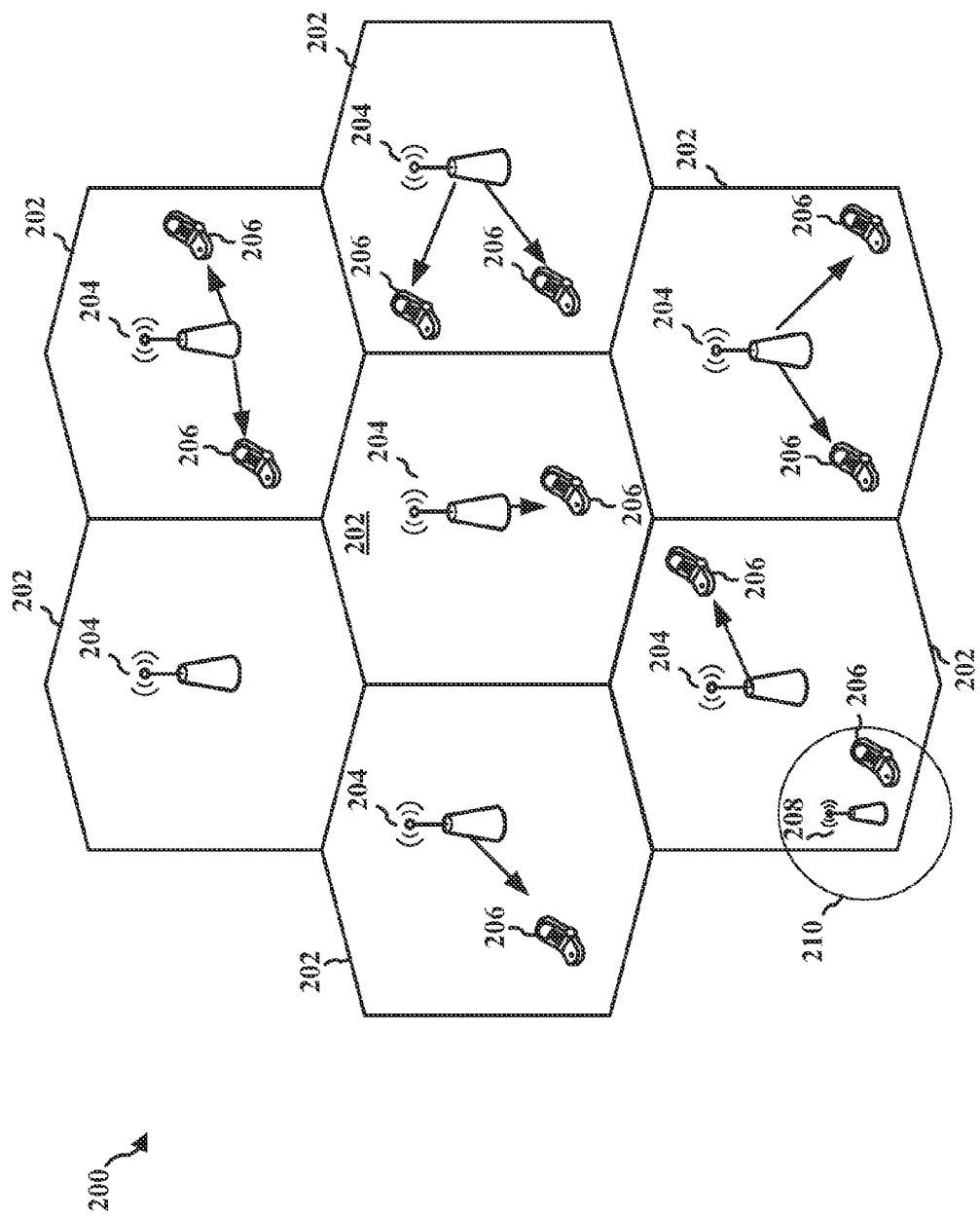
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDMA is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
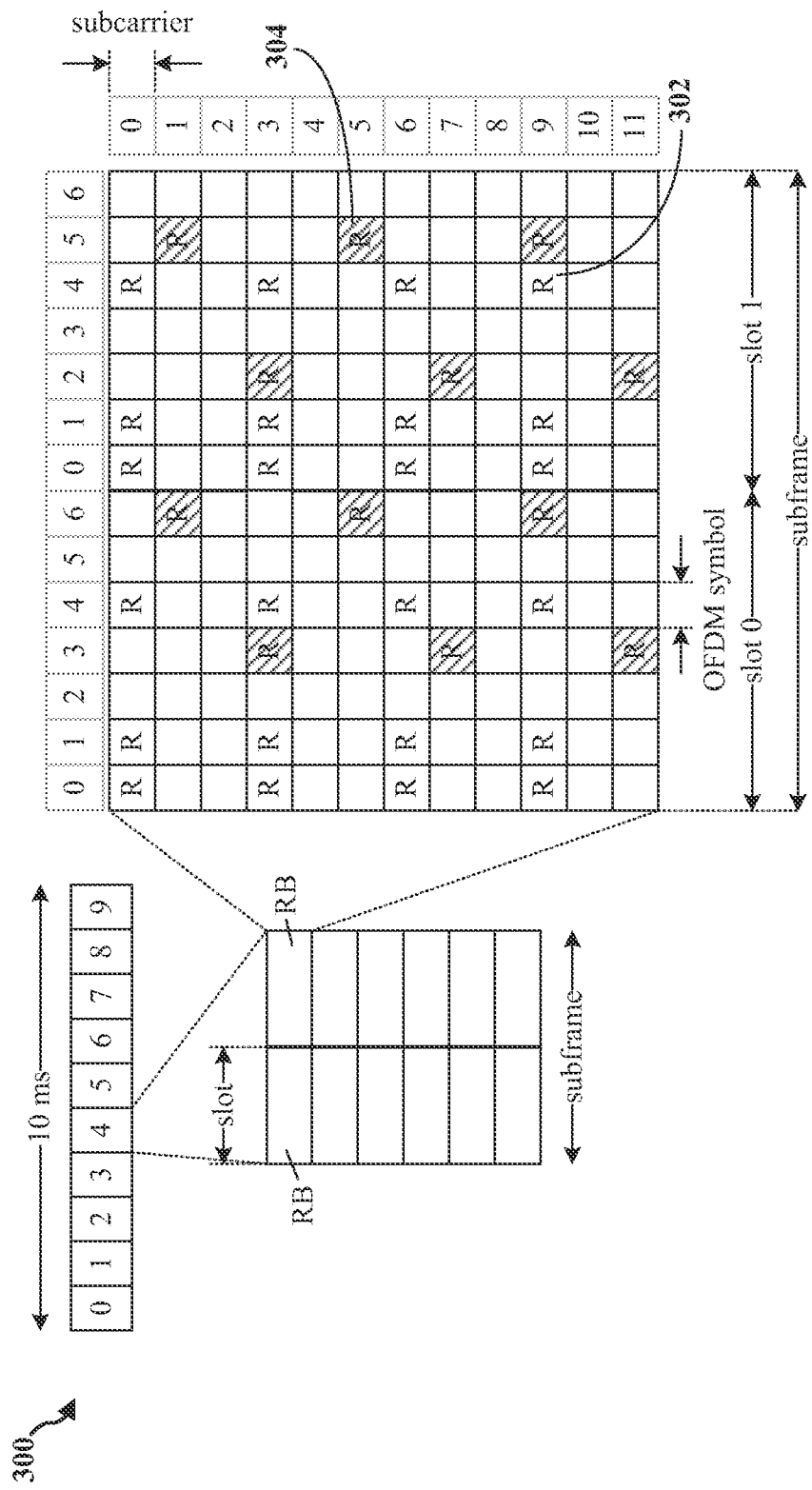
FIG. 3 is a diagram illustrating an example of a DL frame structure in LTE.

FIG. 3 is a diagram 300 illustrating an example of a DL frame structure in LTE using normal cyclic prefix. A frame (10 ms) may be divided into 10 equally sized subframes each of duration 1 ms. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
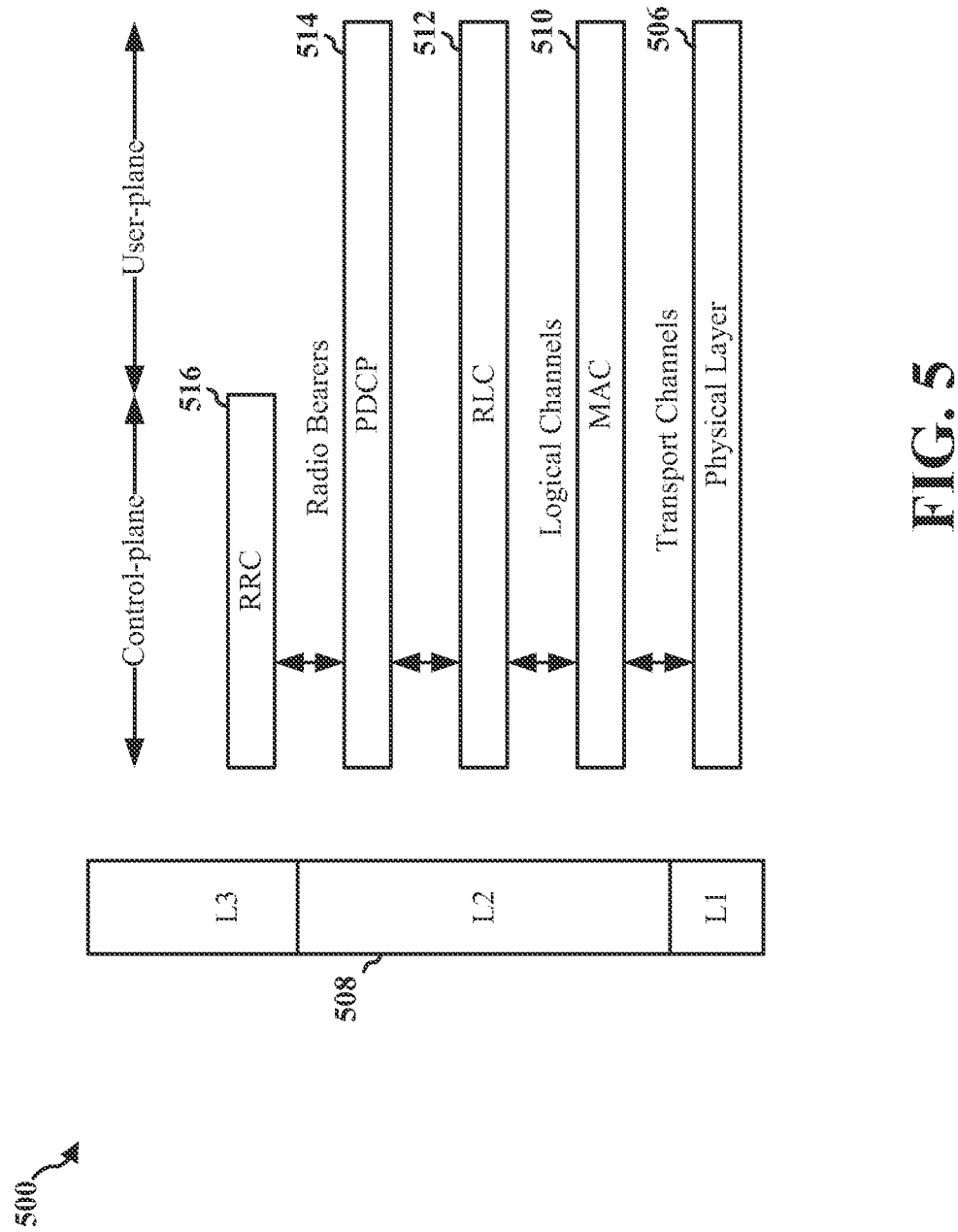
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
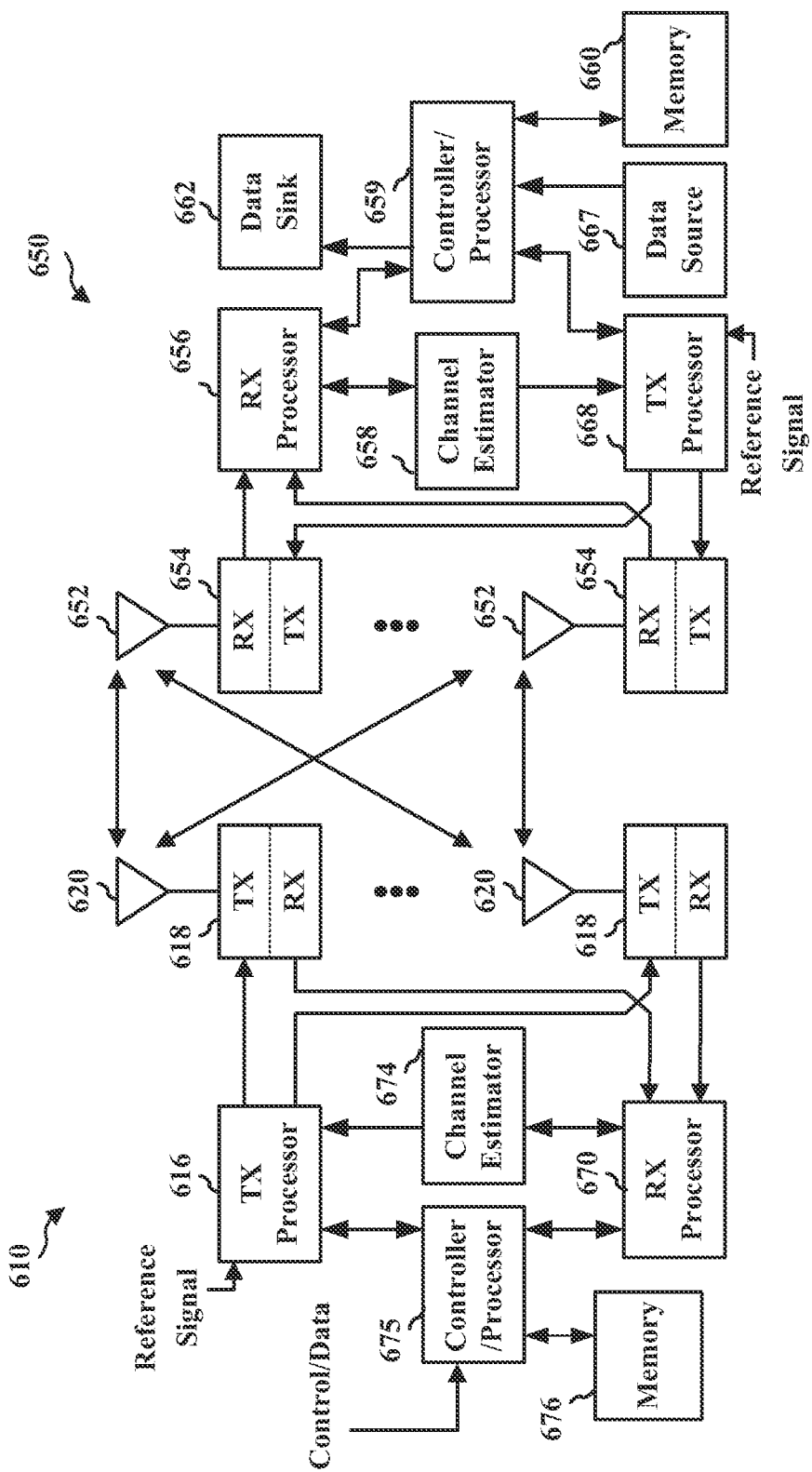
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

Figure 7:
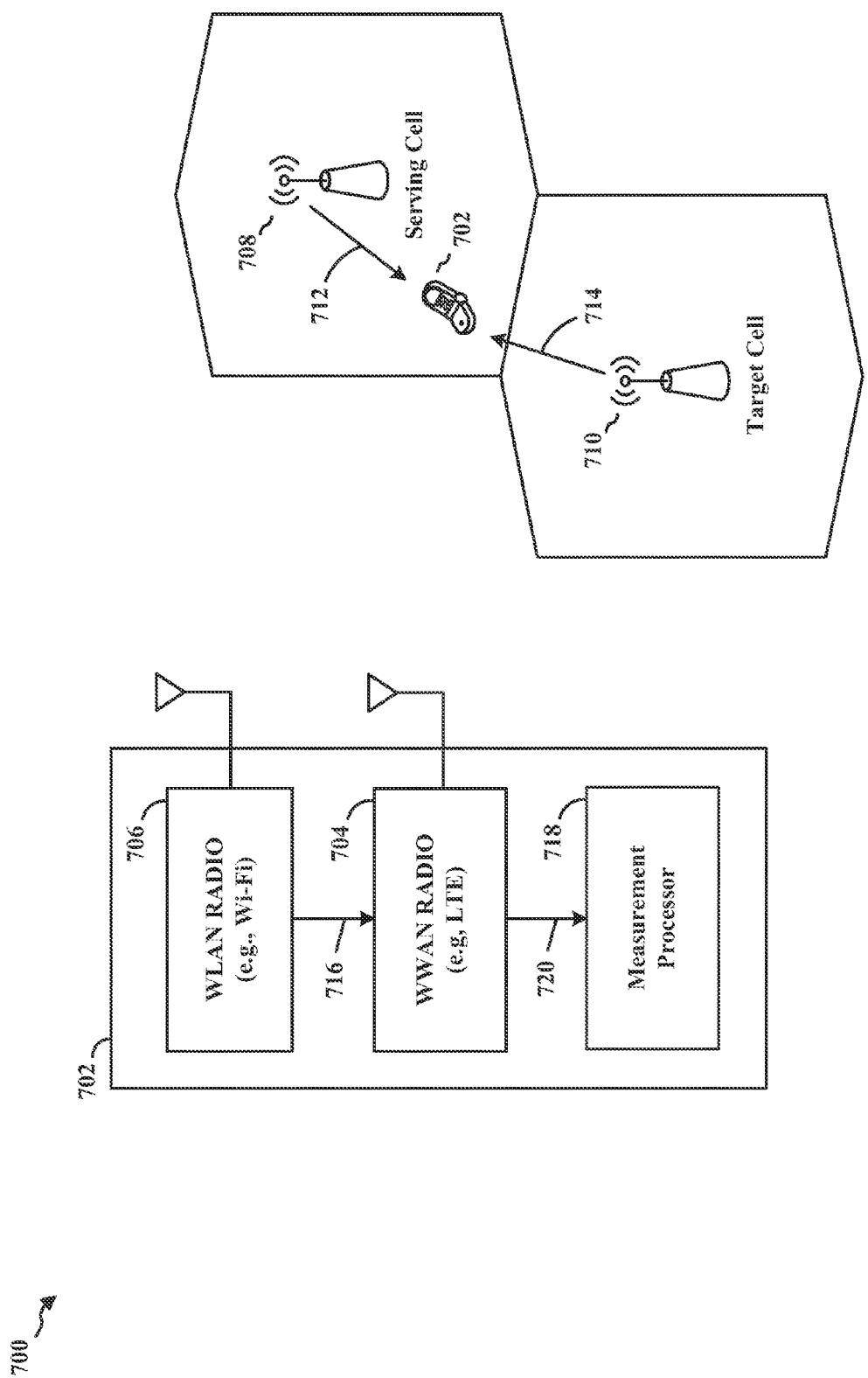
FIG. 7 is an illustration of a UE with multiple radios.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations FIG. 7 is an illustration 700 of a UE 702 with multiple radios. The UE 702 may contain a WWAN (2/3/4G LTE) radio 704 and WLAN (802.11) radio 706. The respective radios 704, 706 may be referred to herein as one or more of a modem, receive chain, processor, or receive chain processor. Although WWAN radios and WLAN radios are initially designed for specific communication needs, with advances in technology and needs for higher data rates, the use of these two types of radios has started to overlap. It is possible to use a WLAN modem 706 whenever it is available to assist the WWAN modem 704 and vice versa. One such assistance can be during inter-frequency measurements for LTE. For example, when the UE 702 is in connected mode with a serving cell 708, the WLAN radio 706 may assist in cell search and cell measurement for LTE at other frequencies than the serving cell frequency. For example, a UE 702 may need to monitor neighboring cells for potential handovers when the serving cell signal strength becomes weak compared to a predefined threshold. To this end, the WLAN radio 706 may tune away during measurement gaps and capture neighbor cell data. For inter-frequency search, the UE processes the data to obtain PSS and SSS. For inter-frequency measurements, the UE detects RSRP/RSRQ. Inter-frequency search and measurements may coexist with other WWAN functionalities, including for example, intra-frequency search and measurements and serving cell operations.

When the neighbor cell is on a frequency different than the current serving frequency, the neighbor cell search and measurement is an inter-frequency cell search and measurement. The carrier frequency of a "target" inter-frequency neighbor cell 710 is referred to as "target frequency." When the target frequency is sufficiently apart from the serving cell frequency, the measurements on target frequency will require the UE 702 to tune away from its serving frequency. Note that the target frequency may belong to the same frequency band as the serving frequency, or it may belong to a different frequency band.

In a baseline operation of a UE 702 having both a WWAN modem 704 and a WLAN modem 706, the WLAN radio may be used to measure one or more target cells 710 on one or more target frequencies, while the WWAN modem measures serving cells 708 on the serving frequency. As used herein, a "serving cell" 708 is a cell with which the WWAN modem 704 is currently connected to, i.e. has a radio connection. The serving cell 708 has a base station that communicates with the WWAN modem 704 of the UE 702 over a serving frequency An inter-frequency cell referred to as the "target cell" 710 is the cell where the WWAN modem 704 needs to tune away to do inter-frequency measurements on frequencies different from the serving frequency.

If the UE has one receive chain or the UE has multiple receive chains all of which are configured to operate with the serving cell, assistance from the WLAN radio 706 is beneficial because performance of inter-frequency cell search and measurements by the LTE modem 704 itself requires the UE to tune away from the serving frequency, and thus the serving cell, to other frequencies to obtain measurements. The LTE modem 704 may tune away during specified times referred to as measurement gaps. The inter-frequency measurement gaps are configured by the serving eNB allowing the UE to tune away from serving frequency for inter-frequency cell search and measurements. The UE is not scheduled any DL packets during these measurement gaps and thus is not receiving any data from the serving cell 708. Similarly the UE cannot transmit UL packets during these measurement gaps to the serving cell 708. This results in loss of DL and UL throughput as opposed to the case where the UE is not scheduled any measurement gaps.

The use of the WLAN modem 706 to assist inter-frequency measurements avoids measurement gaps, results in higher throughput and better user experience. The WLAN modem 706 may be in idle mode while the WWAN modem 704 is in connected mode. Thus, the WLAN modem 706 is available for assisting inter-frequency WWAN measurements. Even when the WLAN modem 706 is in connected mode, the WLAN modem 706 can create gaps in WLAN Tx/Rx for the WWAN inter-frequency measurements if needed.

As described above, a UE may scan inter-frequency and/or inter-RAT cells while connected to a serving LTE (WWAN) cell using a WLAN receive chain and process the samples for search and measurements. Various tasks are involved in the capture and processing of LTE data using a WLAN modem. These tasks include LTE data capture by a WLAN processor (herein referred to the "WLAN data capture" task), processing of the captured LTE data by the WLAN processor (herein referred to the "WLAN processing" task), data transfer from the WLAN receiver processing to a WWAN receiver processing chain over a transfer bus (herein referred to the "WLAN to WWAN transfer" task), and processing of the transferred data by the WWAN processor (herein referred to the "WWAN processing" task). Each of these tasks has a time period of completion associated with it, and the summation of these time periods defines an overall time budget for an instance of LTE data capture and processing. The overall time budget of an instance should meet particular timing requirements in order to allow other processing to occur.

An "instance" of LTE data capture/processing corresponds to a complete cycle of data capture and processing that includes the tasks described above. For example, an instance may include capture of LTE data by a WLAN processor 706 during a measurement gap, initial processing of the captured data by the WLAN processor such that the captured data would be in a shape similar to what it would look like if it was captured and the necessary initial processing was done by WWAN, transfer of the captured and initially-processed data over a bus 716 to the WWAN processor 704 and further processing of the data by the WWAN processor to complete inter-frequency search, detect inter-frequency measurements, and report results to a measurement processor 718 through a measurement report 720. The measurement processor 718 checks whether certain events have occurred and if so sends the relevant information to serving cell.

There are requirements on measurement reporting between the lower layers and upper layers in the UE and also from UE to eNB. For example, a measurement report 720 corresponding to an instance of LTE data capture/processing may occur every 80 ms. In this case, the overall time budget for an instance of WLAN data capture, WLAN processing, WLAN to WWAN transfer plus WWAN processing is 80 ms. The overall time budget requirements coexist with other processes performed by the WLAN processor 706 and WWAN processor 704. For example, in addition to capturing LTE data samples and performing WLAN processing on the samples, a WLAN processor 706 may also perform other WLAN related tasks, such as capturing higher priority WLAN data. Likewise, in addition to transferring WLAN processed samples of WLAN captured date to the WWAN processor 704, the transfer bus 716 may also perform other bus activity, such as transferring data for other applications. Also, in addition to performing WWAN processing, the WWAN processor 704 may perform other WWAN activity, such as the processing intra-frequency search and measurements.

Figure 8:
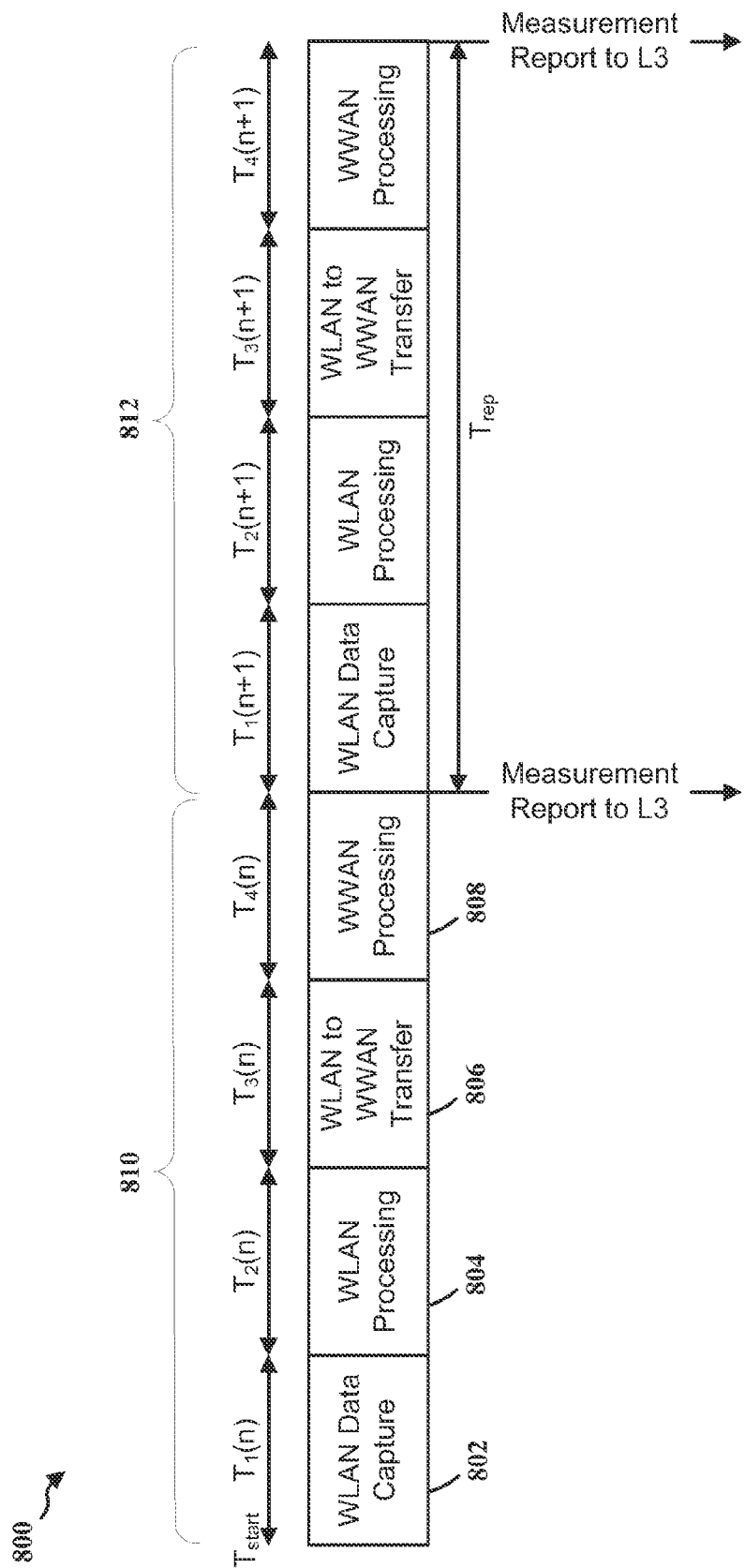
FIG. 8 is an illustration of a timeline of tasks related to two instances of LTE data capture and processing by a WLAN processor receive chain and a WWAN processor receive chain.

FIG. 8 is an illustration 800 of a timeline of tasks related to two instances of LTE data capture/processing by a WLAN processor and a WWAN processor. During time period $T_1(n)$, where n is a first instance, WLAN data capture 802 is performed by a WLAN processor. During time period $T_2(n)$, WLAN processing 804 is performed by the WLAN processor. During time period $T_3(n)$, WLAN to WWAN transfer 806 occurs between the WLAN processor and the WWAN processor. During time period $T_4(n)$ subsequent search/measurement processing is done by the WWAN processor. The total time budget allocated for the first instance 810 of LTE data capture/processing should not exceed a measurement reporting interval $T_{rep}$. In other words, the following condition is satisfied:

$$T_1(n)+T_2(n)+T_3(n)+T_4(n) \leq T_{rep}$$

It is noted that, per current standards, the physical layer measurement period is 480 ms for narrow band (NB) measurements (6 RBs) and 240 ms for measurement bandwidths of 50 RBs. This is for one frequency layer to be monitored. These times are multiplied by the number of frequency layers to be monitored if the number is greater than 1. There is another standard requirement of minimum available time for inter-frequency and inter-RAT measurements during this period (480 ms). To satisfy these requirements, possible embodiments may do more frequent measurements, each for smaller duration (>=5.1 ms), e.g. 5.1 ms, every 40 ms or may do less frequent measurements for larger durations. In view of the foregoing, in one example, the measurement reporting interval may be between 40 ms and 80 ms. The 80 ms upper bound is due to pipelining as per current standards, the requirements for gapless measurements are corresponding to gap pattern id#0

At the end of the measurement reporting interval, the measurement result is reported by the WWAN processor to layer L3. After the measurement is reported, a next instance 812 of LTE data capture/processing similar to the first instance 810 may occur.

The beginnings of time periods $T_2$, $T_3$ and $T_4$ may be characterized as delays with respect to a start time for an instance 810, 812 of LTE data capture/processing. For example, the start of time period T2 corresponding to the beginning of a WLAN processing task 804 may be a referred to as a WLAN processing delay. The start of time period $T_3$ corresponding to the beginning of a WLAN to WWAN transfer task 806 may be a referred to as a WLAN to WWAN transfer delay. The start of time period $T_4$ corresponding to the beginning of a WWAN processing task 808 may be a referred to as a WWAN processing delay. The start time $T_1$ corresponding to the beginning of a WLAN data capture task typically coincides with the start time, as such, there usually is no WLAN data capture delay.

Figure 9:
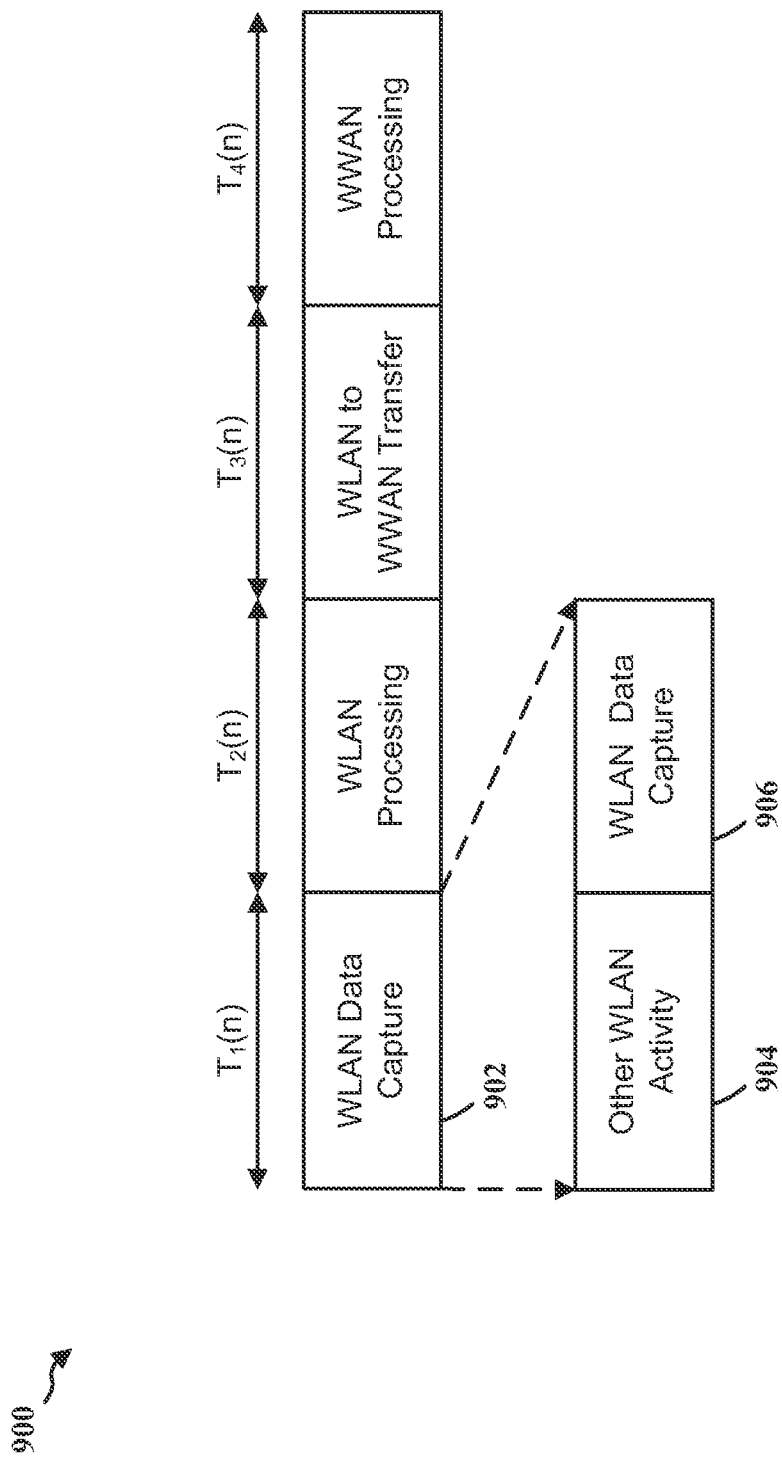
FIG. 9 is an illustration of a timeline of a WLAN data capture task of FIG. 8.

FIG. 9 is an illustration 900 of a timeline of a WLAN data capture task 902. WLAN data capture 902 may include a period of time of other WLAN activity 904 corresponding to activity other than WLAN data capture, and period of time of actual WLAN data capture 906. The start of actual WLAN data capture 906 may be delayed for a period of time corresponding to the duration of other WLAN activity 904. Other WLAN activity may include, for example, sending and/or receiving WLAN packets, and scanning for WLAN channels. The duration $T_1$ of the WLAN data capture 902 portion may be equal or greater than 5.1 ms. The reason for this is that the periodicity of PSS and SSS is 5 ms. Capturing contiguous data for 5.1 ms ensures at least one complete PSS and SSS sequence has been captured. The total duration of time $T_1$ may be defined as follows:

$$T_{1,total}(n)=T_{1,WLAN\_data\_cap}(n)+T_{1,other,WLAN}(n)$$

Figure 10:
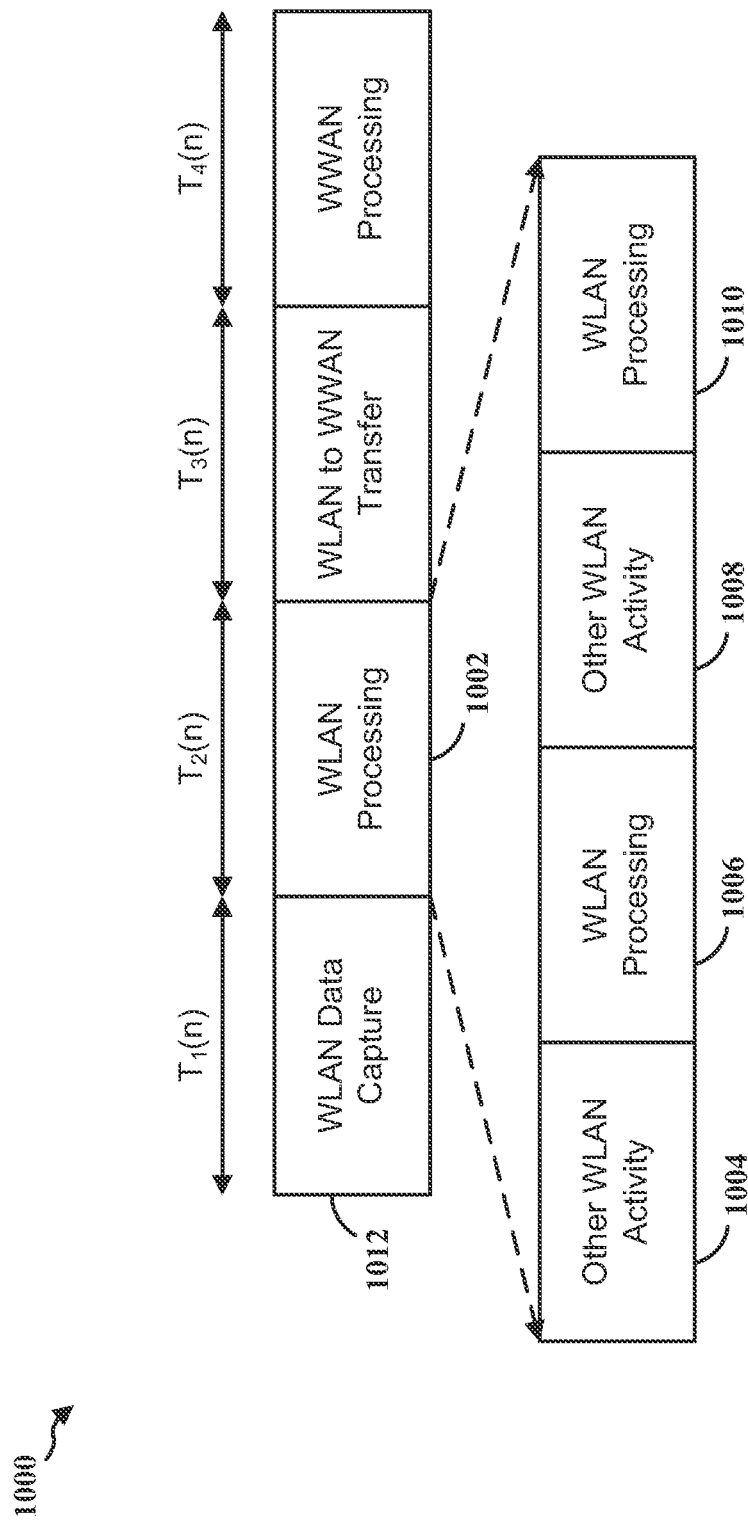
FIG. 10 is an illustration of a timeline of a WLAN processing task of FIG. 8.

FIG. 10 is an illustration 1000 of a detailed timeline of a WLAN processing task 1002. WLAN processing 1002 may include alternating periods of other WLAN activity 1004, 1008 and WLAN processing 1006, 1010 of the WWAN data captured by the WLAN processor during the WLAN data capture task 1012. The total duration, or time budget, of time period $T_2$ may be defined as follows:

$$T_{2,total}(n)=T_{2,WLAN\_pro}(n)+T_{2,other\_WLAN}(n)$$

WLAN processing 1002 involves multiple components. WLAN processing 1006, 1010 may involve filtering, down-sampling, DC offset correction, I/Q imbalance correction, notch filters, frequency and phase rotators, wideband and/or narrow band energy calculation, AGC algorithm, etc. Some of these functions may be implemented in dedicated and/or shared or configurable hardware. Some of these functions may be implemented in software where the software runs on a dedicated and/or shared processor. Time period $T_2$ is dependent on how each block is implemented (hardware verses software) and run time environment (dedicated verses shared) and for cases of software, the speed of the processor.

In general, $T_2=T_{2a}+T_{2b}$, where $T_{2a}$ and $T_{2b}$ represent the hardware and software WLAN processing, respectively. Note that in some cases, $T_{2a}$ and $T_{2b}$ may be interrupted by the WLAN data capture duration period $T_1$. In the rest of the disclosure, for convenience, the combined WLAN processing duration is indicated as $T_2$ (without indicating the hardware and software portions). WLAN processing of WLAN data capture may be interspersed with other applications on the WLAN processor. For simplicity, WLAN processing time period $T_2$ is assumed to capture delays due to such coexistence based solutions. The other WLAN activity 1004, 1008 may include preparing a WLAN packet for transmit and/or demodulation and decoding a WLAN packet after reception.

Based on time periods $T_1$ and $T_2$, the total time budget for WLAN data capture 1012 and WLAN processing 1002 is as follows:

$$T_{1,total}(n)+T_{2,total}(n)=(T_{1,WLAN\_data\_cap}(n)+\\T_{2,WLAN\_pro}(n))+(T_{1,other\_WLAN}(n)+\\T_{2,other\_WLAN}(n))=(1+\alpha(n))((T_{1,WLAN\_data\_cap}(n)+\\T_{2,WLAN\_pro}(n))$$

where α(n) is defined as the WLAN activity factor (can be varying with time)

Figure 11:
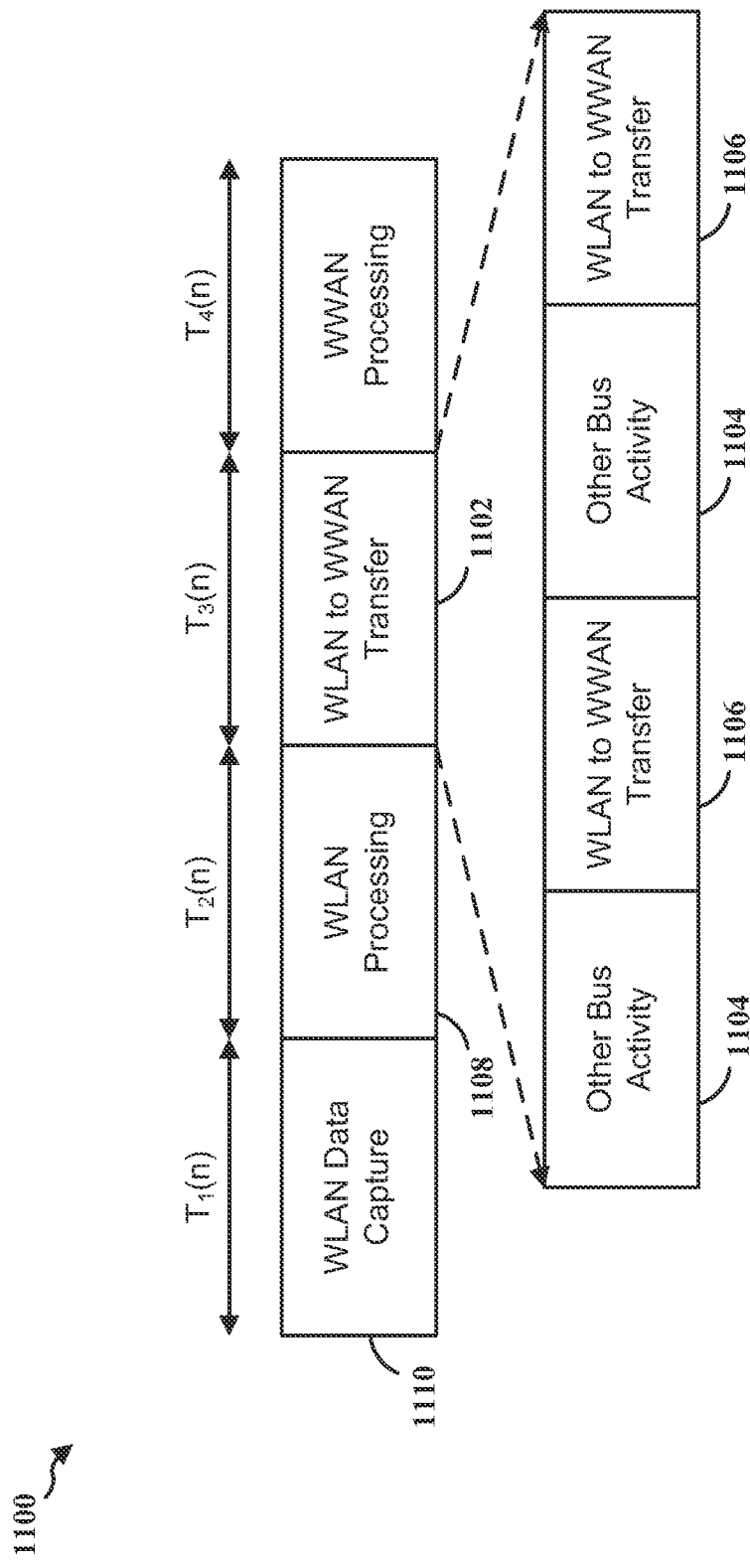
FIG. 11 is an illustration of a timeline of a WLAN to WWAN data transfer task of FIG. 8.

FIG. 11 is an illustration 1100 of a detailed timeline of a WLAN to WWAN transfer task 1102. WLAN to WWAN transfer 1102 may include alternating periods of other transfer bus activity 1104 during which other, perhaps higher priority data is transferred for other application, and WLAN to WWAN transfer 1106. After WLAN processing 1108 of WLAN data capture 1110 is finished, the data is ready to be transferred from the WLAN processor to the WWAN processor. Typically, data is transferred via an existing interface between the WLAN processor and the WWAN processor. There may be multiple processes that require service of the same interface and the data transfer process coexists with such processes. The total duration, or time budget, of time period $T_3$ may be defined as follows:

$$T_{3,total}(n)=T_{3,WLAN\_to\_WWAN\_tran}(n)+T_{3,other\_bus\_act}(n)$$

Figure 12:
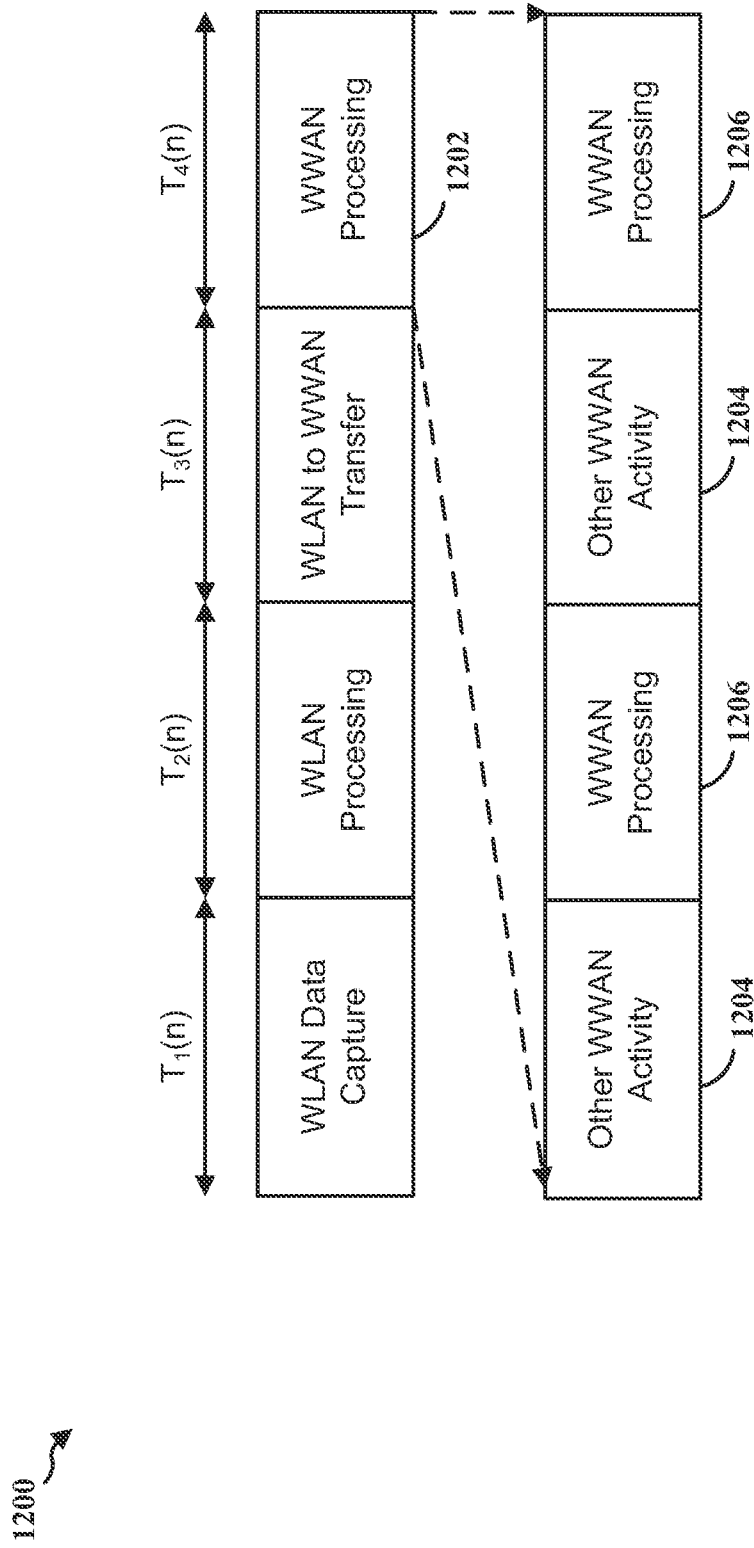
FIG. 12 is an illustration of a timeline of a WWAN processing task of FIG. 8.

FIG. 12 is an illustration 1200 of a detailed timeline of a WWAN processing task 1202. WWAN processing 1202 may include alternating periods of other WWAN activity 1204, such as intra-frequency search and measurements and serving cell operations, and WWAN processing 1206. WWAN processing 1206 may be interspersed with other applications on the WWAN processor. WWAN processing time period $T_4$ is assumed to capture delays due to such coexistence based solutions. The total duration, or time budget, of time period $T_4$ may be defined as follows:

$$T_{4,total}(n)=T_{4,WWAN\_pro}(n)+T_{4,other\_WWAN}(n)=(1+\beta(n))*T_{4,WWAN\_pro}(n)$$

where we define β(n) as the WWAN activity factor (can be varying with time)

Figure 13:
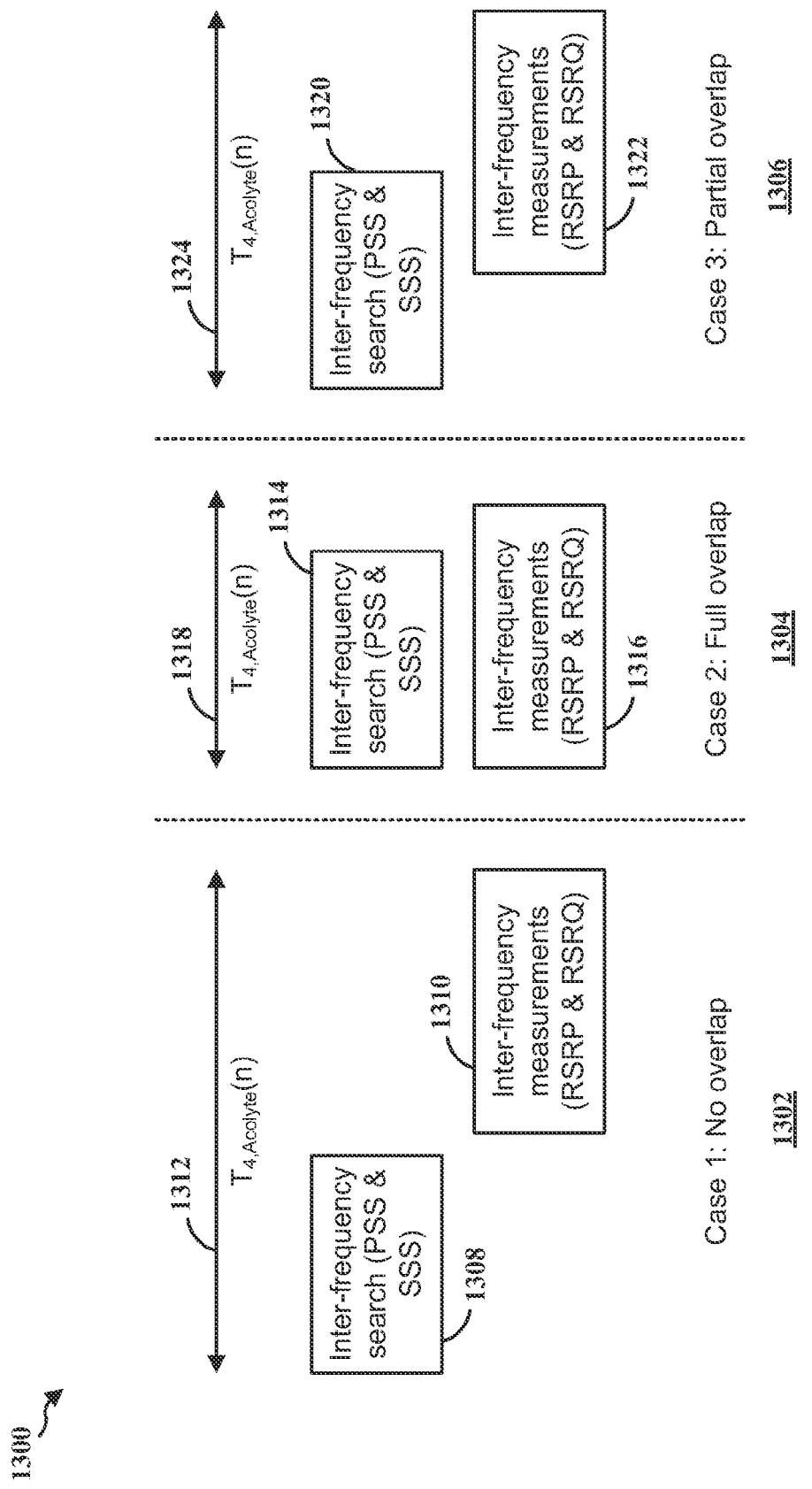
FIG. 13 are illustrations of various condition of the WWAN processing portion of the WWAN processing task of FIG. 12, including no overlap, full overlap or partial overlap conditions.

The WWAN processing portions of time period $T_4$ may involve multiple components. For example, inter-frequency search involves PSS and SSS processing, and inter-frequency measurements involve RSRP/RSRQ detection. With reference to FIG. 13, depending on the implementation, these functionalities may run with no overlap 1302, full overlap 1304 or partial overlap 1306. In the no overlap 1302 implementation, inter-frequency search 1308 and inter-frequency measurements 1310 components occur at different times of a WWAN processing portion 1312. In a full overlap 1304 implementation, inter-frequency search 1314 and inter-frequency measurements 1316 components begin at the same time operate in parallel. In a partial overlap 1306 implementation, inter-frequency search 1320 and inter-frequency measurements 1322 components begin at the different times with respect to the start of a WWAN processing portion 1324 and operate at the same, e.g., in parallel, for a portion of the time period $T_4$. Based on the foregoing implementations, it is possible to adjust the duration of the WWAN processing component of the WWAN processing task.

Figure 14:
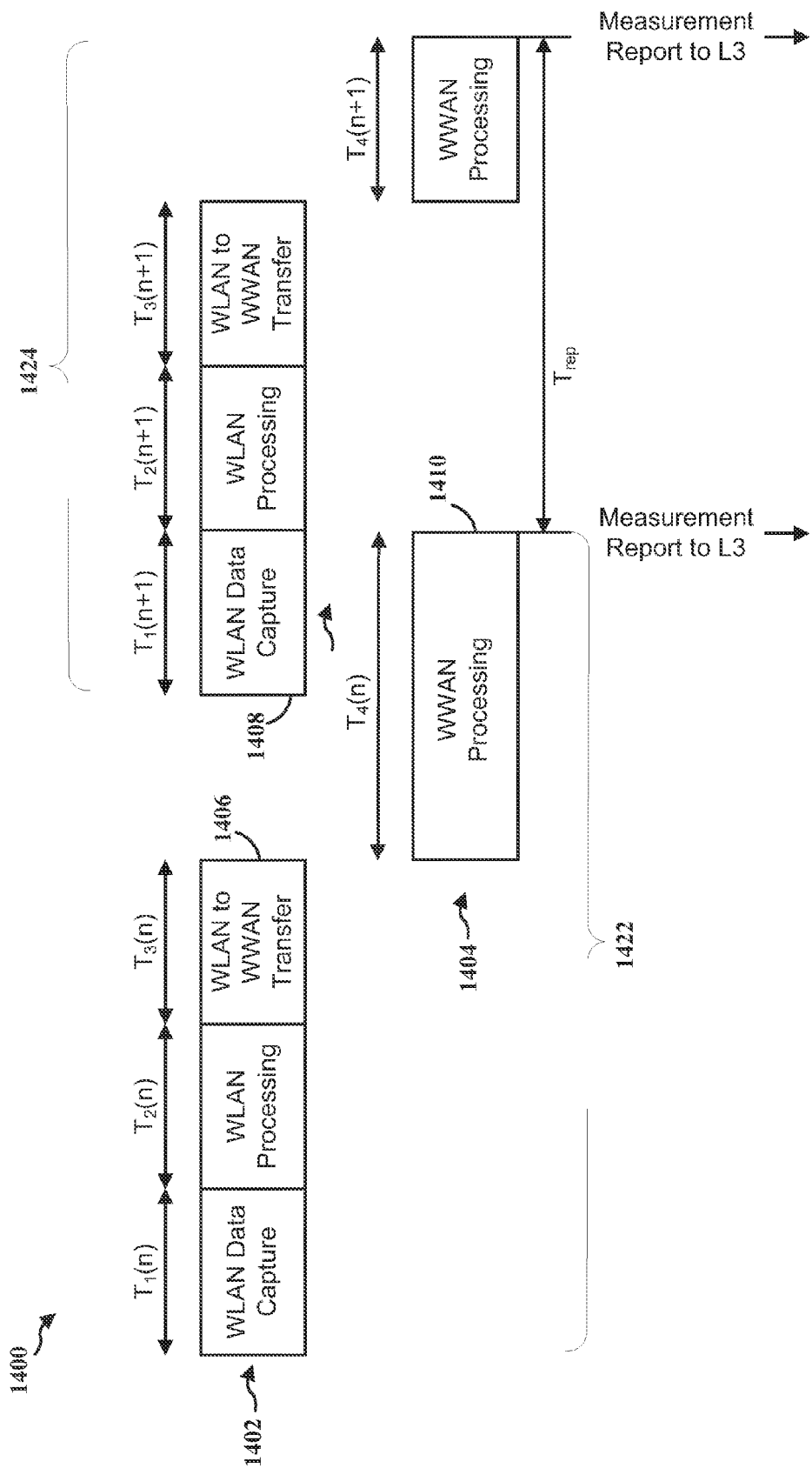
FIG. 14 is an illustration of parallel processing of WLAN and WWAN operations.

FIG. 14 is an illustration 1400 of parallel processing of WLAN and WWAN operations. The top timeline represents operations on the WLAN processor 1402, while the bottom timeline represents operations on the WWAN processor 1404. In order to effectuate changes in the overall time budget of an instance of LTE data capture/processing, the WLAN processor 1402 may operate a new WLAN capture data 1408 while the WWAN processor 1404 operates on previously captured data by performing WWAN processing 1410. This leads to a period of concurrent or parallel processing of a first instance 1422 of LTE data capture and processing and a second instance 1424. Parallel processing by the WLAN processor 1402 and the WWAN processor 1404 may occur as long as the WWAN buffer that contains previous WLAN capture data is not be overwritten by new WLAN capture data before measurements are processed by the WWAN processor. In order to avoid overwriting WLAN capture data, the timing of WWAN processing 1410 by the WWAN processor 1404 is such that there is no overlap between a WLAN to WWAN transfer task 1406 and a WWAN processing task 1410.

Timing conditions to be satisfied by the parallel processing of FIG. 14 follows:

$$T_1(n)+T_2(n)+T_3(n) \leq T_{rep}$$

$$T_3(n)+T_4(n) \leq T_{rep}$$

As previously mentioned, each of the WLAN capture, WLAN processing, WLAN to WWAN transfer and WWAN processing tasks, involves a delay corresponding to the start time of its respective time period, which is dependent on coexistence with other ongoing activities. The respective delays may change depending on the load due to ongoing activities on the WLAN processor side 1402, which include WLAN data capture and WLAN processing, and the WLAN to WWAN transfer bus; and ongoing activities on the WWAN processor side 1404, which includes WWAN processing.

In accordance with processing techniques disclosed herein, after an instance 1422 of LTE data capture/processing, respective delays (or time periods T) of a task may be adjusted and applied during a subsequent instance 1424. This may be implemented by keeping track of ongoing activities within one or more of the tasks performed on the WLAN processor side 1402, and within one or more of the tasks performed on the WWAN processor side 1404, during a current instance. For example, on the WLAN processor side 1402, a device may determine one or more of times $T_1$, $T_2$ and $T_3$ as the amount of time required to complete the WLAN data capture task ($T_1$), the WLAN processing task ($T_2$) and the WLAN to WWAN transfer task ($T_3$). On the WWAN processor side 1404, a device may determine time $T_4$ as the amount of time required to complete the WWAN processing task. These times may be determined based on start and stop times recorded by the device during performance of each respective task.

Determined times $T_1$, $T_2$, $T_3$ and $T_4$ are processed to determine if an overall time budget criterion is satisfied. In one configuration, the times are added together to determine if the following criterion is satisfied:

$$T_1(n)+T_2(n)+T_3(n)+T_4(n) \leq T_{rep}$$

where $T_{rep}$ is the overall time budget.

If the overall time budget criterion is not satisfied, the device may adjust one or more of the offset delays or time periods $T_1$, $T_2$, $T_3$, $T_4$ for the next instance of LTE data capture/processing. With respect to adjustments of offset delays, one or more allowable overlaps between different tasks may be implemented in order to reduce the overall time budget requirement for an instance. For example, as shown in FIG. 14, one or more of the tasks associated with the WLAN processor side 1402, such as the WLAN data capture 1408 may overlap with one or more of the tasks associated with the WWAN processor side 1404, such as the WWAN processing 1410. This may be implemented by reducing the offset delay corresponding to the start of time $T_1(n+1)$ so that the start time $T_1(n+1)$ occurs during the time $T_4(n)$.

With respect to adjustments of time periods $T_1$, $T_2$, $T_3$, $T_4$, the timings of components included in one or more of the WLAN data capture task, the WLAN processing task, the WLAN to WWAN transfer task, and the WWAN processing task may be adjusted to reduce the time. For example, with reference to FIG. 13, time period $T_4$ may be reduced by implementing a full overlap or partial overlap of the inter-frequency search component and the inter-frequency measurement component.

If the overall time budget of an instance of LTE data capture/processing is less than the criterion, the device may implement time adjustments for the next instance that increase the amount of time allotted to one or more of the tasks. For example, if the overall time budget criterion is $T_{rep}=40$ ms, and the current instance has times $T_1$ through $T_4$ that added up to only 35 ms, the UE may allocate and additional 3 ms to the WLAN processor side and an additional 2 ms to the WWAN processor side.

Figure 15:
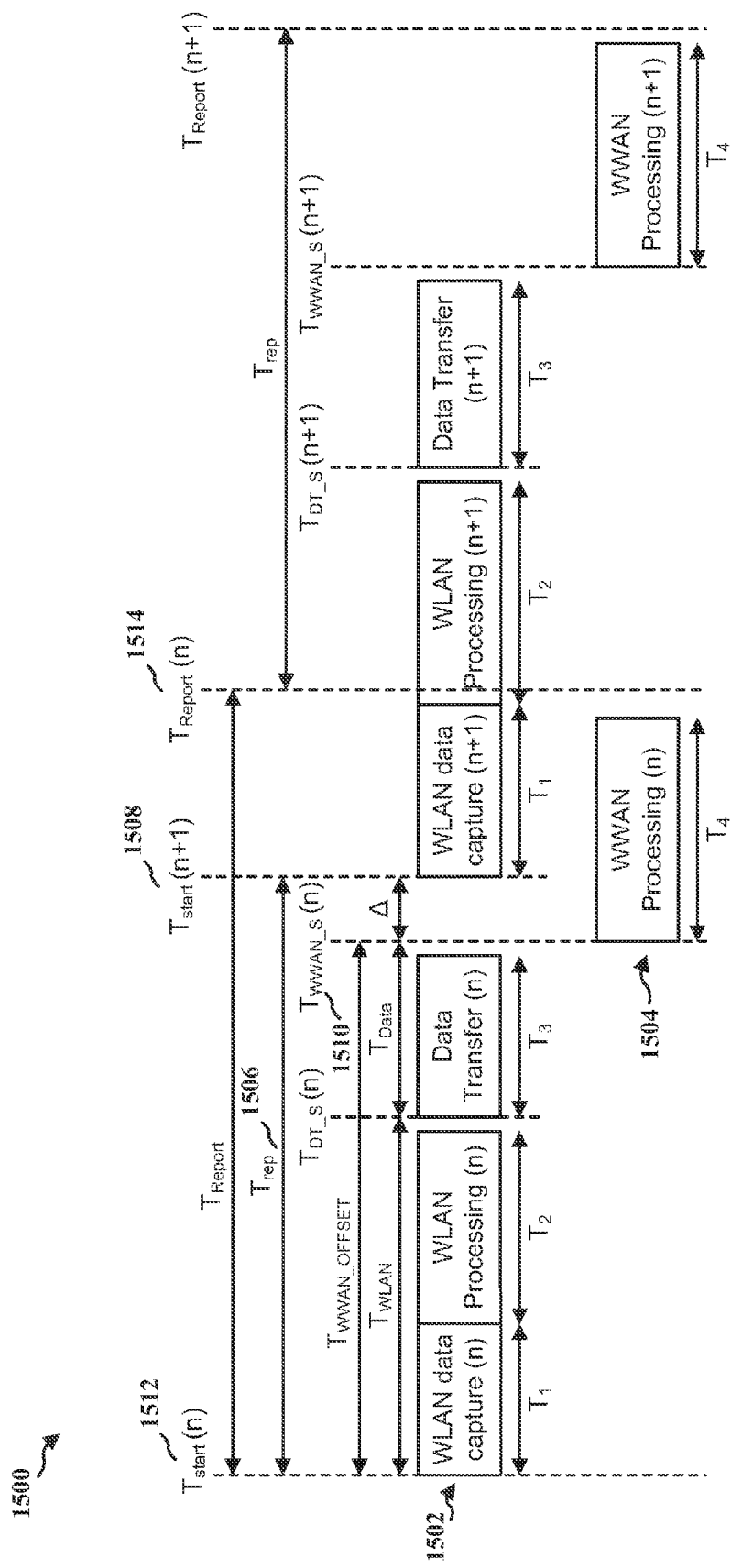
FIG. 15 is an illustration of WLAN processing in parallel with WWAN processing, wherein WWAN processing is on time.

FIG. 15 is an illustration 1500 of WLAN processing in parallel with WWAN processing, wherein WWAN processing is on time. The top timeline represents operations on the WLAN processing side 1502, while the bottom timeline represents operations on the WWAN processing side 1504. The following describe the time budget for each of the WLAN processor side and the WWAN processor side:

---

If $T_{WWAN\_OFFSET} < T_{rep}$ then the following apply:
  For WLAN processor side 1502 time budget:
    All processing shall be done before WWAN processing:
      $T_{WLAN\_Pro} + T_{Data} = T_{WWAN\_OFFSET}$
    WLAN processing deadline:
      $T_1 + T_2 < T_{WLAN\_Pro} = T_{WWAN\_OFFSET} - T_{Data}$,
      $= (T_{rep} - T_{Data}) - \Delta$, where $\Delta = |T_{rep} - T_{WWAN\_OFFSET}|$
    Data transfer deadline: $T_3 < T_{Data}$
  For WWAN processing 1504 time budget:
    WWAN processing shall be done before next data transfer, accordingly $T_4 < T_{DT\_s}(n+1) - T_{WWAN\_s}(n) = (T_{rep} + T_{WLAN\_Pro}) - T_{WWAN\_OFFSET} = (T_{rep} - T_{Data})$

---

Figure 16:
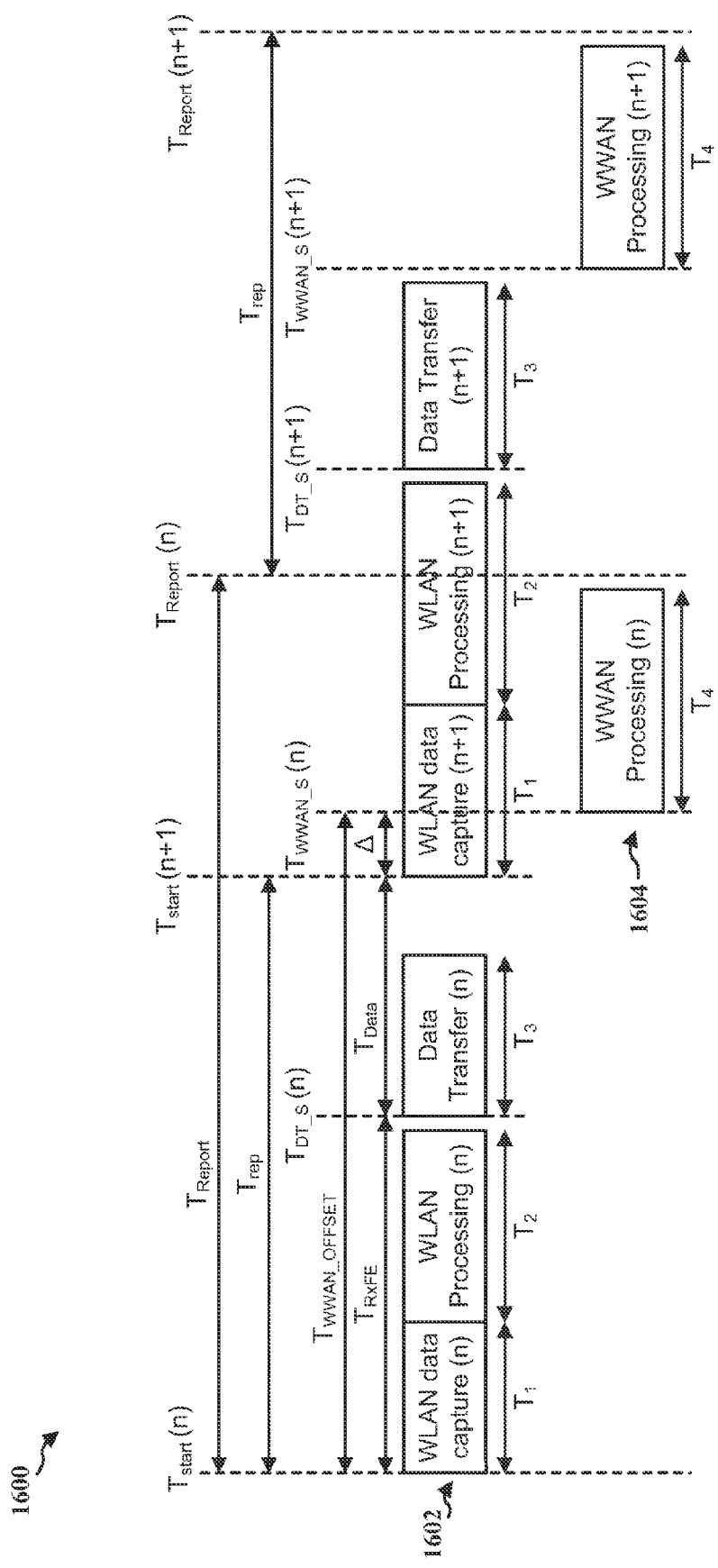
FIG. 16 is an illustration of WLAN processing in parallel with WWAN processing, wherein WWAN processing is delayed.

FIG. 16 is an illustration 1600 of WLAN processing in parallel with WWAN processing, wherein WWAN processing is delayed. The top timeline represents operations on the WLAN processing side 1602, while the bottom timeline represents operations on the WWAN processing side 1604. The following describe the time budget for each of the WLAN processor side and the WWAN processor side:

---

If $T_{WWAN\_OFFSET} > T_{rep}$ the following apply:
  For WLAN processor 1602 time budget:
    All processing shall be done before next capture:
      $T_{WLAN\_Pro} + T_{Data} = T_{rep}$
      WLAN processing deadline: $T1 + T2 < T_{WLAN\_Pro} = (T_{rep} - T_{Data})$
      Data transfer deadline : $T3 < T_{data}$
  For WWAN processing 1604 time budget:
    WWAN processing shall be done before next data transfer:
      $T4 < T_{DT\_s}(n+1) - T_{WWAN\_s}(n) = (T_{rep} + T_{RxFE}) - T_{WWAN\_OFFSET} = T_{WLAN\_Pro} - (T_{WWAN\_OFFSET} - T_{drep}) = (T_{rep} - T_{data}) - \Delta$, where $\Delta = |T_{rep} - T_{WWAN\_OFFSET}|$

---

Figure 17A:
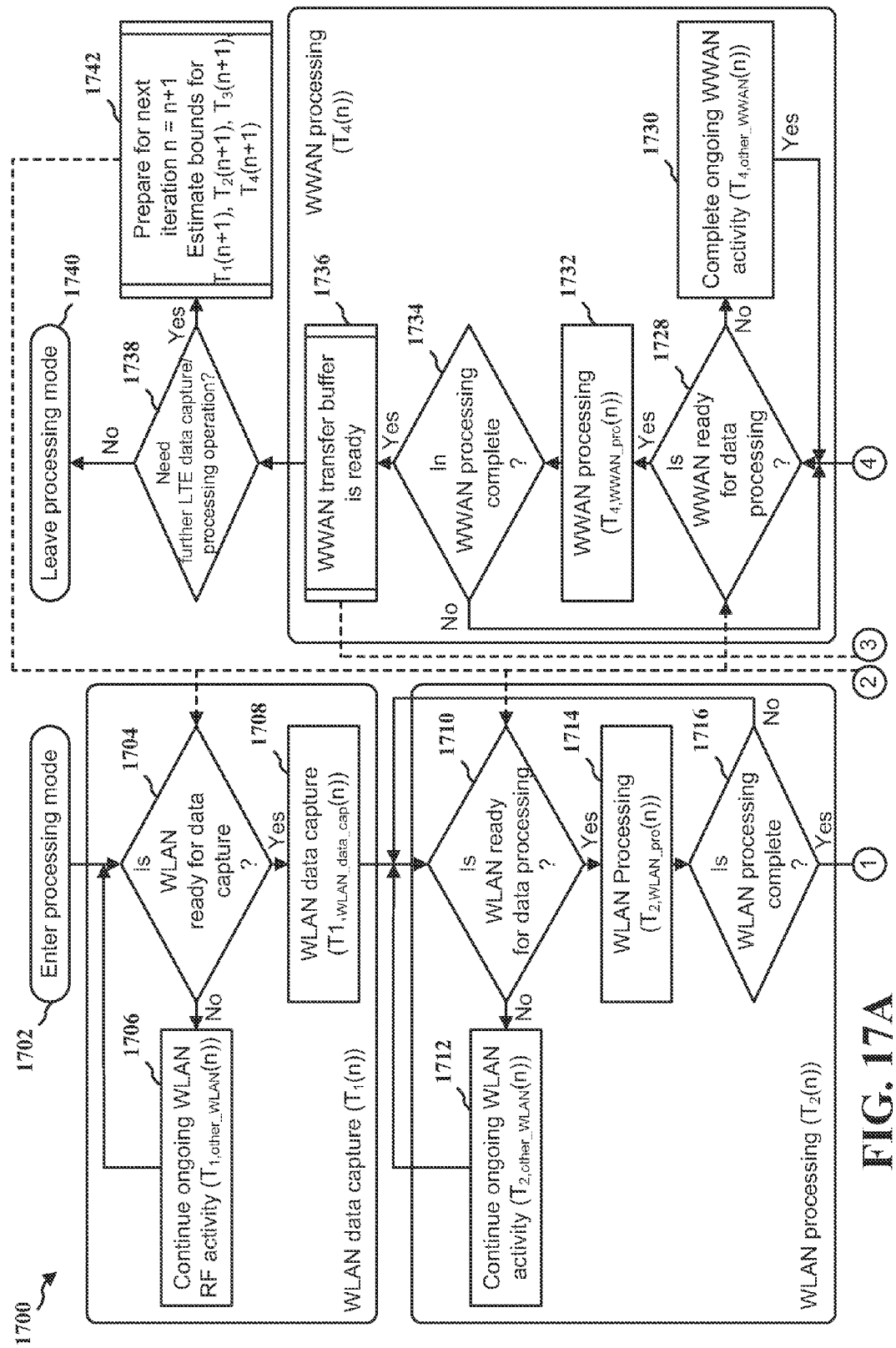
FIG. 17A and FIG. 17B are a flowchart of a method of LTE data capture/processing by a WLAN processor and a WWAN processor.
Figure 17B:
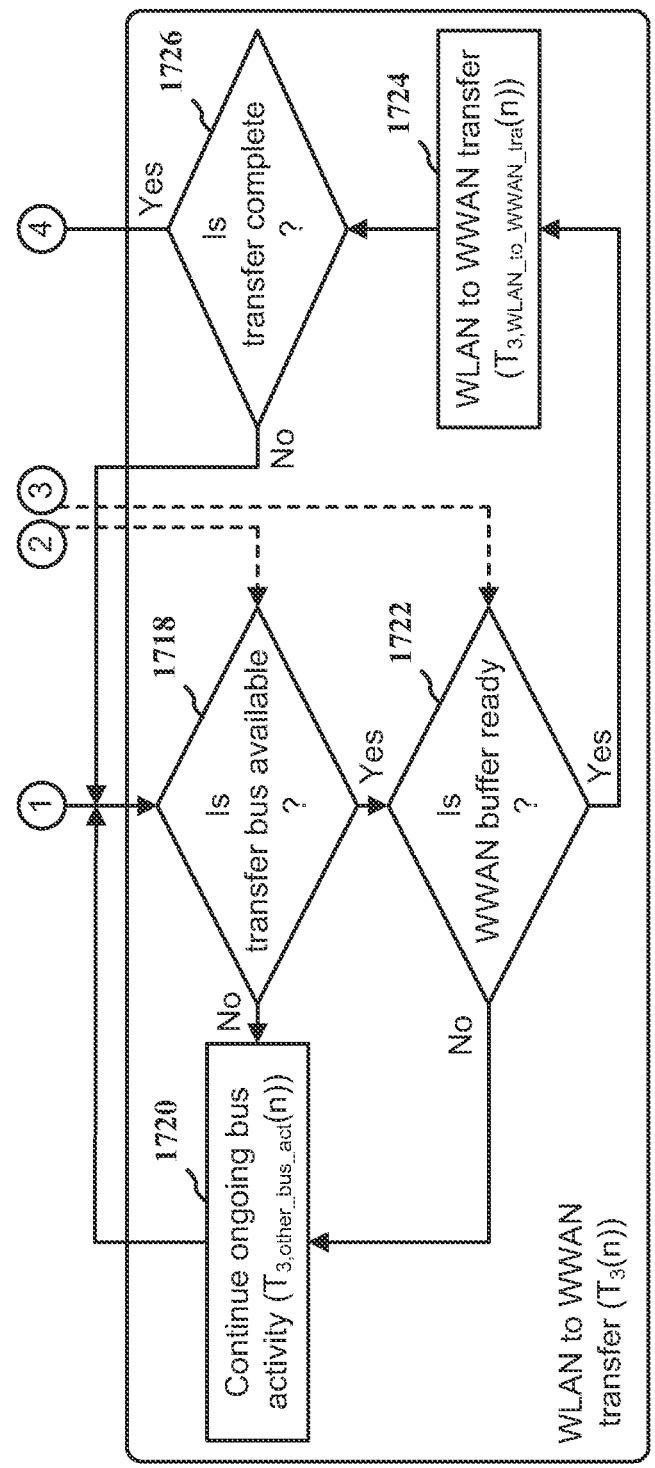

FIG. 17A and FIG. 17B are a flowchart of a method of LTE data capture/processing by a WLAN processor and a WWAN processor. The method may be performed by a UE. At step 1702, a LTE data capture/processing mode is entered. At step 1704 the UE determines if the WLAN processor side (hereinafter referred to "WLAN") is ready to perform data capture. If the UE determines the WLAN is performing some other WLAN activity, then the process proceeds to step 1706, where the ongoing WLAN activity is performed. After a period of time of the ongoing activity, the UE returns to step 1704, where it again determines if the WLAN is ready to perform data capture. If the WLAN is ready to perform data capture, the process proceeds to step 1708. During this process the UE keeps track of the time taken to perform the other WLAN activity, for example by maintaining time measures, e.g., time stamps, a running clock, etc. while the other activity is being performed.

At step 1710, the UE determines if the WLAN is available to process data captured by the WLAN. If the UE determines the WLAN is performing some other WLAN activity, then the process proceeds to step 1712, where the ongoing WLAN activity is performed. After a period of time of the ongoing WLAN activity, the UE returns to step 1710, where it again determines if the WLAN is available to process data captured by the WLAN. If the WLAN is ready to perform such data processing, the process proceeds to step 1714. During this process the UE keeps track of the time taken to perform the other WLAN activity, for example by maintaining time measures, e.g., time stamps, a running clock, etc. while the other activity is being performed.

At step 1716, the UE determines if the WLAN processing of WLAN captured data is complete. If the processing is not complete, the process returns to step 1710, where the UE determines if the WLAN is still available to process data captured by the WLAN. The WLAN may become unavailable for WLAN-captured data processing if it is needed to perform another more important WLAN processing task.

Returning to step 1716, if the UE determines the WLAN processing of WLAN captured data is complete, the process proceeds to step 1718, where the UE determines if the WLAN to WWAN transfer bus is available. If the UE determines the bus is performing some other bus activity, then the process proceeds to step 1720, where the ongoing bus activity is performed. After a period of time of the ongoing bus activity, the UE returns to step 1718, where it again determines if the bus is available for transfer between the WLAN and the WWAN. During this process the UE keeps track of the time taken to perform the other bus activity, for example by maintaining time measures, e.g., time stamps, a running clock, etc. while the other activity is being performed.

If the bus is available for such transfer, the process proceeds to step 1722 where the UE determines if the WWAN buffer is ready to receive the data to be transferred from the WLAN to the WWAN. If the buffer is not ready to receive the data, the process returns to step 1720, where the bus may be used to perform other bus activity. The process loop of steps 1718, 1720 and 1722 may be repeated until the UE determines, at step 1722, that the WWAN buffer is ready to receive the data from the WLAN.

At step 1724, the UE performs a WLAN to WWAN transfer over the bus. At step 1726, the UE determines if all of the data to be transferred from the WLAN to the WWAN was actually transferred. In other words, the UE determines if the transfer was complete. If the transfer was not complete, the process returns to step 1718, where the UE determines of the transfer bus is available. The process loop of 1718, 1722, 1724 and 1726 is repeated until the UE determines that the transfer was complete.

At step 1728, the UE determines if the WWAN processor side (hereinafter referred to as "WWAN") is ready to process the data it received from the WLAN. If the UE determines the WWAN is performing some other WWAN activity, then the process proceeds to step 1730, where the ongoing WWAN activity is performed. After a period of time of the ongoing WWAN activity, the UE returns to step 1728, where it again determines if the WWAN is available to process data received from the WLAN. If the WWAN is ready to perform such data processing, the process proceeds to step 1732. During this process the UE keeps track of the time taken to perform the other WWAN activity, for example by maintaining time measures, e.g., time stamps, a running clock, etc. while the other activity is being performed.

At step 1732, the UE determines if WWAN processing is complete. If processing is not complete, the process returns to step 1728, where the UE again determines if the WWAN is still available to process the data received from the WLAN. The WWAN may become unavailable for WLAN-provided data processing if it is needed to perform another more important WWAN processing task. The processing loop of steps 1734, 1728, 1730, 1732 is repeated until the UE determines, at step 1734, that WWAN processing is complete. The process then proceeds to step 1736, where the UE determines if the WWAN transfer bus is ready to transfer the WWAN processed data to a measurement processor.

At step 1738, the UE determines if another instance of WLAN data capture/processing data is needed. For example, the UE may determine another instance is not needed by determining the ongoing LTE search and measurement has been canceled. The UE may determine such cancellation upon receipt of a cancellation message from the serving base station. The UE may also determine such cancellation when a handover occurs and the new serving base station does not configure the UE for search and measurement. The UE may also determine cancellation when certain thresholds are exceeded so that inter frequency search is no longer necessary. If the UE determines no further instances are needed, the process proceeds to step 1740, where the processing mode ends. If the UE determines another instance is needed, the process proceeds to step 1742, where the UE prepares for the next instance. To this end, and as described above, the UE may process the time periods $T_1$, $T_2$, $T_3$ $T_4$ of the tasks to determine if an overall time budget criterion is satisfied.

With reference to FIG. 15, in an example implementation, WLAN processor side tasks, e.g., WLAN data capture, WLAN processing and WLAN to WWAN data transfer, for a first instance of LTE data capture/processing is completed within a time period $T_{rep}$ 1506. At completion of $T_{rep}$ 1506 a next cycle of WLAN data capture, WLAN processing and WLAN to WWAN data transfer for a next instance of LTE data capture/processing begins at a time $T_{start}$ (n+1) 1508 corresponding to:

$$T_{start}(n+1) = T_{start}(n) + T_{rep}$$

WWAN processing 1504 for the first instance begins at a WWAN processing offset time $T_{WWAN\_S}(n)$ 1510 with respect to the start time $T_{start}$ (n) 1512. Upon completion of WWAN processing 1504, the results of the first instance of LTE data capture/processing are reported at a report time $T_{Report}$ (n) 1514:

$$T_{Report}(n+1) = T_{Report}(n) + T_{rep}$$

In some configurations, a WLAN to WWAN data transfer task and a WWAN processing task may share the single memory pool. In this case, synchronization between the two tasks is needed. The following two time constants are involved in such synchronization:

A time period $T_{WLAN}$ corresponds to a time period within which both a WLAN data capture task and a WLAN processing task is completed. The end of the time period $T_{WLAN}$ also corresponds to the time at which the WLAN to WWAN data transfer task begins. Regarding the latter, this time may be referred to as a data transfer start offset $T_{DT\_S}$.

The time period $T_{WWAN\_OFFSET}$ corresponds to a time period within which a WLAN data capture task, a WLAN processing task, and a WLAN to WWAN data transfer task is completed. The end of the time period $T_{WWAN\_OFFSET}$ also corresponds to the time at which a WWAN processing task starts. This time may also be referred to as a WWAN processing start offset $T_{WLAN\_S}$. The time period $T_{Data}$ corresponds to a time period within which a WLAN to WWAN data transfer is completed.

Based on the foregoing, and the time periods shown in FIG. 15, a time deadline for completing a cycle of WLAN processor side processing tasks may be defined as: $T_{WLAN} + T_{Data}$=minimum time out of the set ($T_{rep}$, $T_{WWAN\_OFFSET}$). Within the cycle of WLAN processor side task, a time deadline for completing a WLAN to WWAN data transfer task may be defined as a time period $T_3$ less than a time period $T_{data}$. A time to report measurement results of a current instance of LTE data capture/processing may be defined as a time delay with respect to a start time Tstart(n). This report delay $T_{Report}(n)$ 1514 may be defined as: $T_{WWAN\_OFFSET} + T_4$, wherein the delay $T_{Report}(n)$ is less than the time of next WLAN to WWAN data transfer task $T_{DT\_S}(n+1)$, where $T_{DT\_S}(n+1) = T_{rep} + T_{WLAN}$.

Time deadlines for completing processing tasks, e.g., the WLAN data capture task, the WLAN processing task, and the WWAN processing task, may be characterized as follows: The combined time periods $T_1$ and $T_2$ within which to complete the WLAN data capture task and the WLAN processing task is less than the time period $T_{WLAN}$, where $T_{WLAN}$=the minimum value of ($T_{WWAN\_OFFSET}$, $T_{rep}$)−$T_{Data}$. The time period $T_4$ within which to complete a WWAN processing task is less than $(T_{rep} + T_{RxFE}) - T_{WWAN\_OFFSET}$ In a sample case of determining times or time periods for an instance LTE data capture/processing, where $T_{WWAN\_OFFSET} = T_{rep}$, and the following equalities apply:

$$T_{WLAN} + T_{Data} = T_{rep}, T_3 < T_{Data}$$

$$T_1 + T_2 < T_{WLAN} = T_{rep} - T_{Data}$$

$$T_4 < T_{RxFE} = T_{rep} - T_{Data}$$

The following simplified equalities result:

$$T_1 + T_2 < T_{rep} - T_{Data}$$

$$T_4 < T_{rep} - T_{Data}$$

$$T_3 < T_{Data}$$

Comparing with the simple case of where $T_{WWAN\_OFFSET} = T_{rep}$, using $T_{rep}$ and $T_{data}$, if $T_{WWAN\_OFFSET} < T_{rep}$, then:

$$T_1 + T_2 < (T_{rep} - T_{data}) - \Delta$$

$$T_4 < (T_{rep} - T_{Data})$$

$$T_3 < T_{Data}$$

if $T_{WWAN\_OFFSET} > T_{rep}$, then:

$$T_1 + T_2 < (T_{rep} - T_{data})$$

$$T_4 < (T_{rep} - T_{Data}) - \Delta$$

$$T_3 < T_{Data}$$

where $\Delta = |T_{rep} - T_{WWAN\_OFFSET}|$

In summary, if WWAN processing starts with earlier offset ($T_{MSM\_OFFSET} < T_{rep}$), WLAN processing deadline is reduced by A. If, however, WWAN processing starts with later offset ($T_{MSM\_OFFSET} > T_{rep}$), WWAN processing deadline is reduced by Δ.

Figure 18:
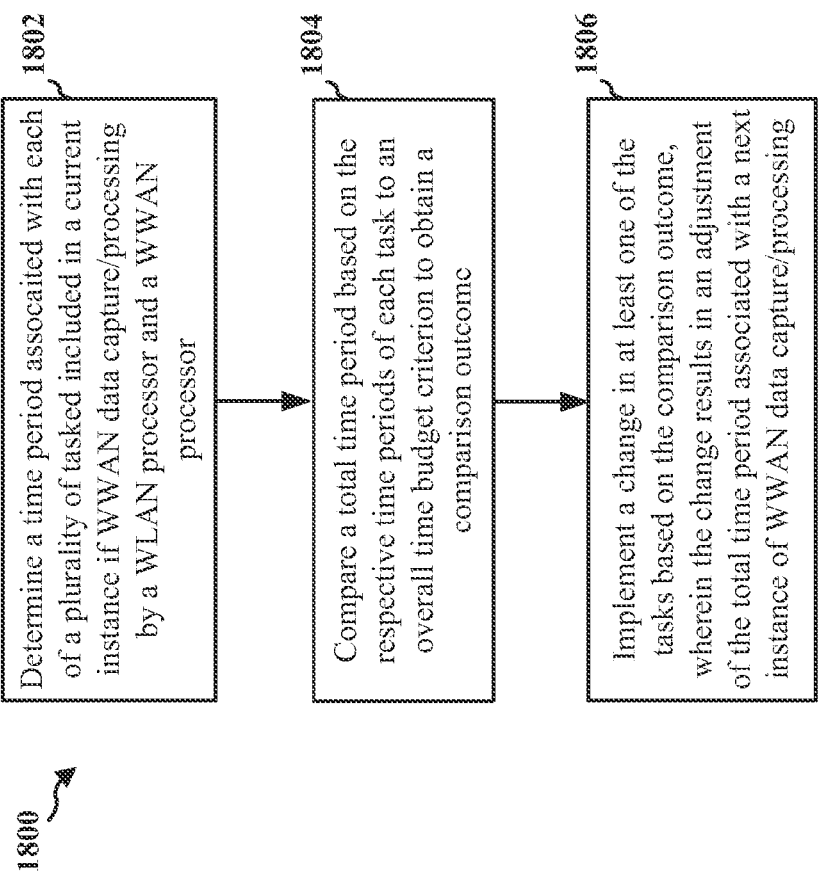
FIG. 18 is a method of wireless communications.

FIG. 18 is a flow chart 1800 of a method of wireless communication. The method may be performed by a UE (e.g., the UE 702, the apparatus 1902/1902'). At step 1802, the UE determines a time period associated with each of a plurality of tasks included in a current instance of WWAN data capture/processing by a WLAN processor and a WWAN processor. To this end, the UE may maintain measures of time corresponding to a time period taken to complete each task. These tasks may include WLAN data capture, WLAN processing, WLAN to WWAN data transfer and WWAN processing. A task may include one or core components corresponding to performance of WWAN data capture/processing activities and one or more other components corresponding to performance of activities other than WWAN data capture/processing activities. For example, with reference to FIGS. 9-12, a core component of WWAN data capture/processing activities may include a WLAN data capture component 906, one or more WLAN processing components 1006, one or more WLAN to WWAN transfer components 1106, and one or more WWAN processing components 1206. Non-core components may include other WLAN activity 904, 1004, other bus activity 1104 and other WWAN activity 1204. For each respective task, the UE keeps track of the time it takes to complete each of the one or more core components and the one or more non-core components. A time period for a particular task may be obtained by adding the completion times of all core components and non-core components of that task.

At step 1804, the UE compares a total time period to an overall time budget criterion to obtain a comparison outcome. The total time period may a summation of the respective time periods of each task.

At step 1806, the UE implements a change in at least one of the tasks based on the comparison outcome. The change results in an adjustment of the total time period associated with a next instance of WWAN data capture/processing by the WLAN processor and the WWAN processor. If the comparison outcome corresponds to a condition where the total time period exceeds the overall time budget, the adjustment of the total time period associated with the next instance may be a reduction in time. The reduction in time may be obtained by reducing a time period associated with one of the plurality of tasks, and/or reducing a start time associated with one of the plurality of tasks. If the comparison outcome corresponds to a condition where the total time period is less than the overall time budget, the adjustment of the total time period associated with the next instance may be an increase in time. The increase in time may be obtained by increasing a time period associated with one of the plurality of tasks, and/or increasing a start time associated with one of the plurality of tasks.

In one technique of adjusting a total time period, at least one of the plurality of tasks includes a first component and a second component, and implementing a change comprises performing the first component at least partially at the same time as the second component, to thereby reduce the total time period. In an example of this implementation, the tasks is a WWAN processing task and the first component is an inter-frequency search component that determines PSS and/or SSS and the second component is an inter-frequency measurement component that determines RSRP and/or RSRQ.

In another technique of adjusting a total time period, the UE implements a change by performing a first of the plurality of tasks at least partially at the same time as a second of the plurality of tasks, to thereby reduce the total time period. This may be accomplished by setting the start time of one of the first task or the second task so that the tasks partially overlap in time. In one example, the first task may be a WLAN data capture task performed by the WLAN processor and the second task may be a WWAN processing task performed by the WWAN processor. The UE ensures that performance of the first task at the same time as the second task during the next instance does not result in loss of WLAN data captured during the current instance.

Figure 19:
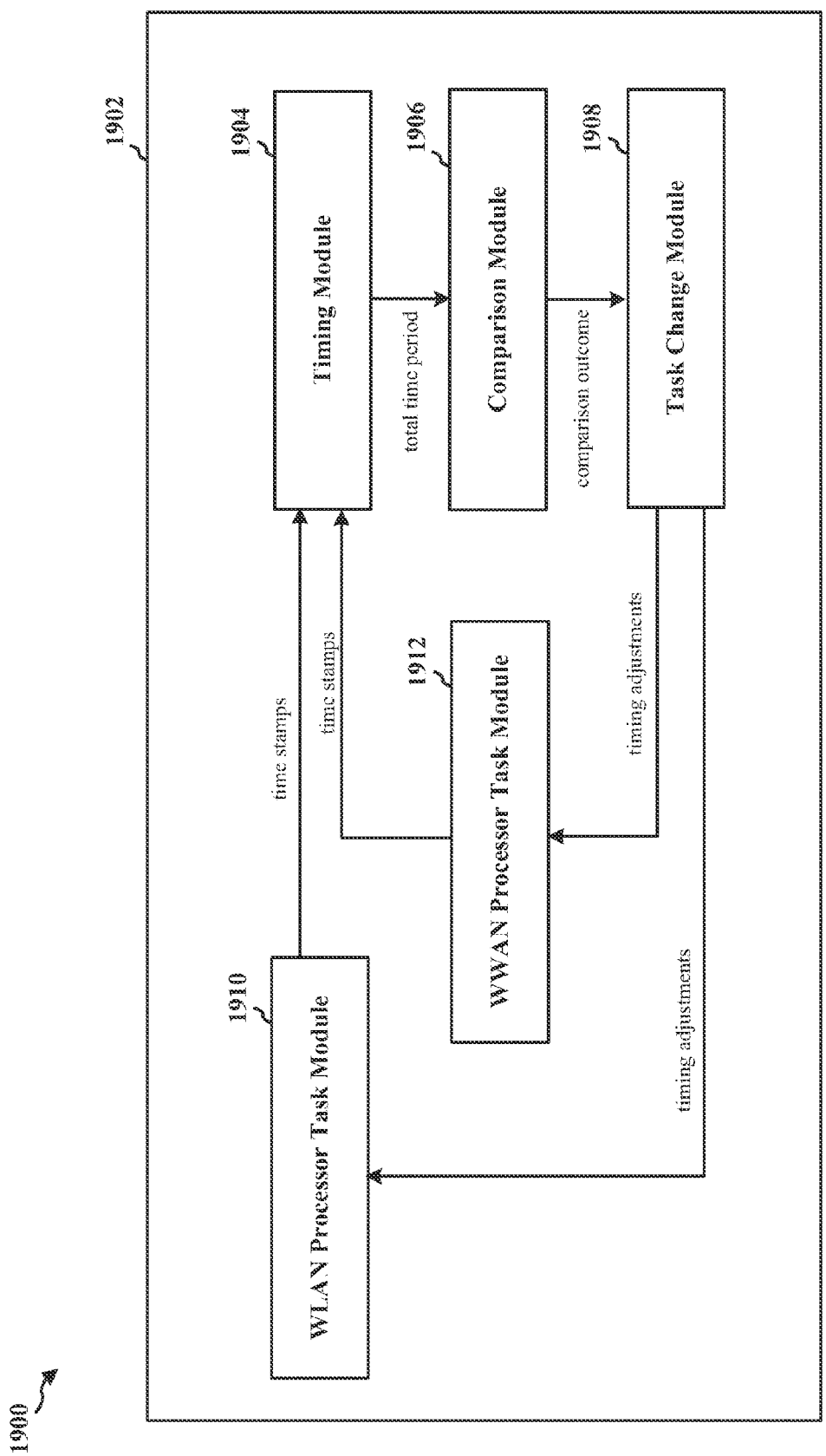
FIG. 19 is a conceptual data flow diagram illustrating different modules/means/components in an exemplary apparatus.

FIG. 19 is a conceptual data flow diagram 1900 illustrating different modules/means/components in an exemplary apparatus 1902. The apparatus may be a UE. The apparatus includes a timing module 1204, a comparison module 1906, a task change module 1908, a WLAN processor task module 1910 and a WWAN processor task module 1912.

The WLAN processor task module 1910 performs WLAN tasks related to WWAN data capture/processing of LTE data by a WLAN processor and a WWAN processor. The WLAN processor task module 1910 performs the WLAN data capture tasks, the WLAN processing tasks and the WLAN to WWAN data transfer tasks described above. The WWAN processor task module 1912 performs WWAN tasks related to the capture/processing of LTE data with a WLAN modem and a WWAN modem. The WWAN processor task module 1912 performs the WWAN processing tasks described above.

The timing module 1204 determines a time period associated with each of a plurality of tasks included in a current instance of WWAN data capture/processing by a WLAN processor and a WWAN processor. To this end, the timing module 1204 may maintain measures of time corresponding to a time period taken to complete each task. These tasks may include WLAN data capture, WLAN processing, WLAN to WWAN data transfer and WWAN processing.

The comparison module 1906 compares a total time period to an overall time budget criterion to obtain a comparison outcome. The total time period may a summation of the respective time periods of each task performed by the WLAN processor task module 1910 and the WWAN processor task module 1912.

The task change module 1908 implements a change in at least one of the tasks based on the comparison outcome. The change results in an adjustment of the total time period associated with a next instance of WWAN data capture/processing by the WLAN processor and the WWAN processor.

The apparatus 1902 may include additional modules that perform each of the steps of the algorithm in the aforementioned flow charts of FIGS. 17 and 18. As such, each step in the aforementioned flow charts of FIGS. 17 and 18 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 20:
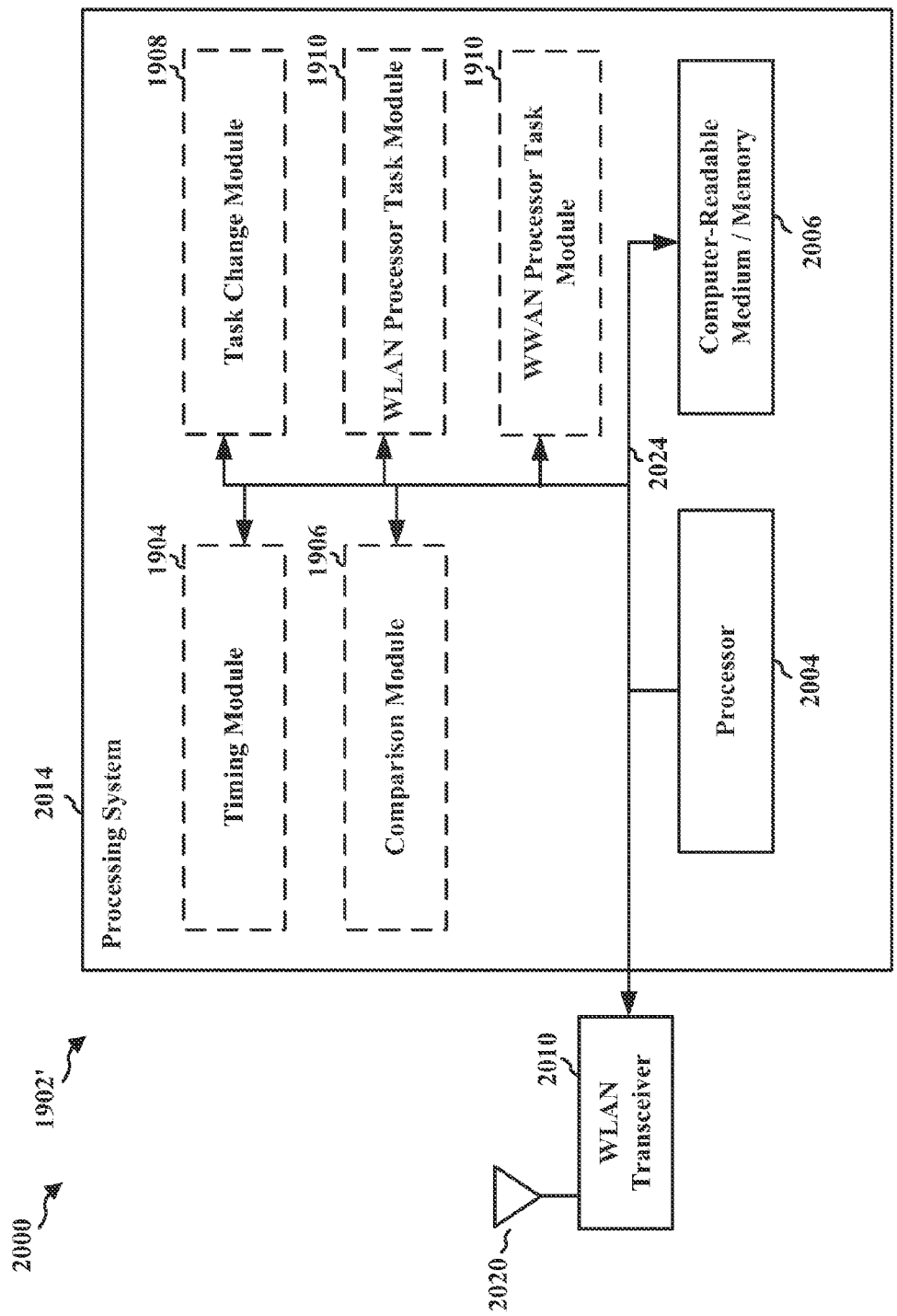
FIG. 20 is a diagram illustrating an example of a hardware implementation for an apparatus employing a processing system

FIG. 20 is a diagram 2000 illustrating an example of a hardware implementation for an apparatus 1902' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware modules, represented by the processor 2004, the modules 1904, 1906, 1908, 1910, 1912 and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014. In addition, the transceiver 2010 receives information from the processing system 2014, and based on the received information, generates a signal to be applied to the one or more antennas 2020.

The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system further includes at least one of the modules 1904, 1906, 1908, 1910 and 1912. The modules may be software modules running in the processor 2004, resident/stored in the computer readable medium/memory 2006, one or more hardware modules coupled to the processor 2004, or some combination thereof. The processing system 2014 may be a component of the UE 650 and may include the memory 660 and/or at least one of the TX processor 668, the RX processor 656, and the controller/processor 659.

In one configuration, the apparatus 1902/1902' for wireless communication includes means for determining a time period associated with each of a plurality of tasks included in a current instance of WWAN data capture/processing by a WLAN processor and a WWAN processor, means comparing a total time period comprising the respective time periods of each task to an overall time budget criterion to obtain a comparison outcome, and means for implementing a change in at least one of the tasks based on the comparison outcome, wherein the change results in an adjustment of the total time period associated with a next instance of WWAN data capture/processing by the WLAN processor and the WWAN processor.

The aforementioned means may be one or more of the aforementioned modules of the apparatus 1902 and/or the processing system 2014 of the apparatus 1902' configured to perform the functions recited by the aforementioned means. As described supra, the processing system 2014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication comprising:
    determining a time period associated with each of a plurality of tasks included in a current instance of WWAN data capture/processing by a WLAN processor and a WWAN processor;
    comparing a total time period comprising the respective time periods of each task to an overall time budget criterion to obtain a comparison outcome; and
    implementing a change in at least one of the tasks based on the comparison outcome, wherein the change results in an adjustment of the total time period associated with a next instance of WWAN data capture/processing by the WLAN processor and the WWAN processor,
    wherein the changes is implemented by performing a first task of the plurality of tasks in the next instance at least partially at the same time as a second task of the plurality of tasks in the current instance.

2. The method of claim 1, wherein determining a time period associated with each of a plurality of tasks comprises maintaining measures of time corresponding to a time period taken to complete the task.

3. The method of claim 2, wherein:
    the task comprises one or more core components corresponding to performance of WWAN data capture/processing activities and one or more non-core components corresponding to performance of activities other than WWAN data capture/processing activities; and maintaining measures of time comprises keeping track of a time to complete each of the one or more core components and the one or more non-core components.

4. The method of claim 1, wherein when the comparison outcome corresponds to a condition where the total time period exceeds the overall time budget, the adjustment of the total time period associated with the next instance comprises a reduction in time.

5. The method of claim 4, wherein the reduction in time is obtained by one or more of reducing a time period associated with one of the plurality of tasks, and reducing a start time associated with one of the plurality of tasks.

6. The method of claim 1, wherein when the comparison outcome corresponds to a condition where the total time period is less than the overall time budget, the adjustment of the total time period associated with the next instance comprises an increase in time.

7. The method of claim 6, wherein the increase in time is obtained by one or more of increasing a time period associated with one of the plurality of tasks, and increasing a start time associated with one of the plurality of tasks.

8. The method of claim 1, wherein at least one of the plurality of tasks comprises a first component and a second component, and implementing a change comprises performing the first component at least partially at the same time as the second component.

9. The method of claim 8, wherein the at least one of the plurality of tasks comprises a WWAN processing task and the first component comprises an inter-frequency search component and the second component comprises an inter-frequency measurement component.

10. The method of claim 1, wherein the first task is performed by the WLAN processor and the second task is performed by the WWAN processor.

11. The method of claim 10, wherein the first task corresponds to a WLAN data capture task and the second task corresponds to a WWAN processing task.

12. An apparatus for wireless communication comprising:
means for determining a time period associated with each of a plurality of tasks included in a current instance of WWAN data capture/processing by a WLAN processor and a WWAN processor;
means for comparing a total time period comprising the respective time periods of each task to an overall time budget criterion to obtain a comparison outcome; and
means for implementing a change in at least one of the tasks based on the comparison outcome, wherein the change results in an adjustment of the total time period associated with a next instance of WWAN data capture/processing by the WLAN processor and the WWAN processor,
wherein the changes is implemented by performing a first task of the plurality of tasks in the next instance at least partially at the same time as a second task of the plurality of tasks in the current instance.

13. The apparatus of claim 12, wherein the means for determining a time period associated with each of a plurality of tasks is configured to maintain measures of time corresponding to a time period taken to complete the task.

14. The apparatus of claim 13, wherein:
the task comprises one or more core components corresponding to performance of WWAN data capture/processing activities and one or more non-core components corresponding to performance of activities other than WWAN data capture/processing activities; and the means for determining maintains measures of time by being configured to keep track of a time to complete each of the one or more core components and the one or more non-core components.

15. The apparatus of claim 12, wherein when the comparison outcome corresponds to a condition where the total time period exceeds the overall time budget, the adjustment of the total time period associated with the next instance comprises a reduction in time.

16. The apparatus of claim 15, wherein the reduction in time is obtained by one or more of reducing a time period associated with one of the plurality of tasks, and reducing a start time associated with one of the plurality of tasks.

17. The apparatus of claim 12, wherein when the comparison outcome corresponds to a condition where the total time period is less than the overall time budget, the adjustment of the total time period associated with the next instance comprises an increase in time.

18. The apparatus of claim 17, wherein the increase in time is obtained by one or more of increasing a time period associated with one of the plurality of tasks, and increasing a start time associated with one of the plurality of tasks.

19. The apparatus of claim 12, wherein at least one of the plurality of tasks comprises a first component and a second component, and the means for implementing a change is configured to perform the first component at least partially at the same time as the second component.

20. The apparatus of claim 19, wherein the at least one of the plurality of tasks comprises a WWAN processing task and the first component comprises an inter-frequency search component and the second component comprises an inter-frequency measurement component.

21. The apparatus of claim 12, wherein the first task is performed by the WLAN processor and the second task is performed by the WWAN processor.

22. The apparatus of claim 21, wherein the first task corresponds to a WLAN data capture task and the second task corresponds to a WWAN processing task.

23. An apparatus for wireless communication, comprising:
a memory; and
at least one processor coupled to the memory and configured to:
determine a time period associated with each of a plurality of tasks included in a current instance of WWAN data capture/processing by a WLAN processor and a WWAN processor;
compare a total time period comprising the respective time periods of each task to an overall time budget criterion to obtain a comparison outcome; and
implement a change in at least one of the tasks based on the comparison outcome, wherein the change results in an adjustment of the total time period associated with a next instance of WWAN data capture/processing by the WLAN processor and the WWAN processor,
wherein the changes is implemented by performing a first task of the plurality of tasks in the next instance at least partially at the same time as a second task of the plurality of tasks in the current instance.

24. A non-transitory computer-readable medium storing computer executable code, comprising code to:
- determine a time period associated with each of a plurality of tasks included in a current instance of WWAN data capture/processing by a WLAN processor and a WWAN processor;
- compare a total time period comprising the respective time periods of each task to an overall time budget criterion to obtain a comparison outcome; and
- implement a change in at least one of the tasks based on the comparison outcome, wherein the change results in an adjustment of the total time period associated with a next instance of WWAN data capture/processing by the WLAN processor and the WWAN processor,
- wherein the changes is implemented by performing a first task of the plurality of tasks in the next instance at least partially at the same time as a second task of the plurality of tasks in the current instance.

* * * * *